(12) United States Patent
Wise (10) Patent No.: US 8,001,374 B2
(45) Date of Patent: Aug. 16, 2011

(54) MEMORY ENCRYPTION FOR DIGITAL VIDEO

(75) Inventor: Adrian Philip Wise, Bracknell (GB)

(73) Assignee: LSI Corporation, Milpitas, CA (US)

( * ) Notice: Subject to any disclaimer, the term of this patent is extended or adjusted under 35 U.S.C. 154(b) by 1222 days.

(21) Appl. No.: 11/303,506

(22) Filed: Dec. 16, 2005

(65) Prior Publication Data
US 2007/0140477 A1    Jun. 21, 2007

(51) Int. Cl.
*H04L 9/28* (2006.01)
*G06F 21/00* (2006.01)

(52) U.S. Cl. ......... 713/164; 380/264; 713/190; 713/193

(58) Field of Classification Search ............... 380/28, 380/264; 713/162, 190
See application file for complete search history.

(56) References Cited

U.S. PATENT DOCUMENTS

| | | | | |
|---|---|---|---|---|
| 4,642,688 | A * | 2/1987 | Lowry et al. | 380/218 |
| 5,706,485 | A * | 1/1998 | Barkatullah et al. | 713/401 |
| 7,434,069 | B2 * | 10/2008 | Nessler | 713/193 |
| 2002/0073326 | A1 * | 6/2002 | Fontijn | 713/190 |
| 2003/0046563 | A1 * | 3/2003 | Ma et al. | 713/190 |
| 2006/0061795 | A1 * | 3/2006 | Walmsley | 358/1.14 |

OTHER PUBLICATIONS

M. Frantzen and B. Koehl, Encrypting Off Processor Memory, Dec. 2000, http://www.w4g.org/ee565.html.
John Wiley & Sons, Inc., Publisher, Schneier, Bruce, "Applied Cryptography: Protocols, Algorithms, and Source Code in C", Second Edition, Nov. 1995, New York, NY, pp. 265-301.

* cited by examiner

*Primary Examiner* — Gilberto Barron, Jr.
*Assistant Examiner* — Cordelia P Zecher
(74) *Attorney, Agent, or Firm* — Christopher P. Maiorana, PC (57) ABSTRACT

A method for protecting data between a circuit and a memory is disclosed. The method generally includes the steps of (A) generating a particular address among a plurality of addresses for accessing a particular area among a plurality of areas in the memory, (B) determining a particular key among a plurality of keys associated with the particular area, (C) generating a cipher stream from both the particular address and the particular key and (D) modifying a data item with the cipher stream such that the data item is encrypted during a transfer between the circuit and the memory.

19 Claims, 11 Drawing Sheets

FIG. 1

TABLE I

| KEY VALUES | | | | INDIRECT VALUES | |
|---|---|---|---|---|---|
| TABLE_ADDR[0]=0 | | TABLE_ADDR[0]=1 | | | |
| BITS | MEANING | BITS | MEANING | BITS | MEANING |
| [47] | 0[a] | [47] | 1 | [47] | (RESERVED) |
| [46:0] | KEY[93:47] | [46:0] | KEY[46:0] | [46:21] | (RESERVED) |
| | | | | [20] | ENCRYPT |
| | | | | [19:16] | NUM_BITS[3:0] (1 TO 12) |
| | | | | [15:12] | TOP_BIT[3:0] (27 TO 16) |
| | | | | [11:1] | TABLE_BASE[11:1][b] |
| | | | | [0] | (RESERVED) |

A. IF EITHER BIT [47], IN A PAIR OF ENTRIES THAT DIFFER ONLY IN TABLE_ADDR[0], IS ZERO THEN THE OTHER SHOULD BE TOO, FAILURE TO OBSERVE THE RESTRICTION MAY LEAD TO UNDEFINED BEHAVIOUR.

B. SINCE TABLE_BASE MAY BE EVEN, BIT ZERO MAY BE ASSUMED.

| C1 | C2 | C3 | C4 | C5 | C6 | C7 | C8 | C9 | C10 | P-VALUE | PROPORTION | STATISTICAL TEST | #failing bitstream |
|---|---|---|---|---|---|---|---|---|---|---|---|---|---|
| 14 | 17 | 9 | 11 | 10 | 12 | 16 | 7 | 19 | 13 | 0.264458 | 0.992200 | FREQUENCY | 1 |
| 11 | 13 | 10 | 14 | 11 | 12 | 19 | 8 | 15 | 15 | 0.551026 | 1.000000 | BLOCK-FREQUENCY | 0 |
| 14 | 11 | 9 | 14 | 17 | 7 | 12 | 12 | 17 | 15 | 0.484646 | 0.992200 | CUSUM | 1 |
| 14 | 17 | 11 | 8 | 16 | 10 | 14 | 11 | 15 | 12 | 0.671779 | 0.984400 | CUSUM | 2 |
| 10 | 11 | 8 | 17 | 16 | 11 | 12 | 16 | 13 | 14 | 0.637119 | 0.976600 | RUNS | 3 |
| 11 | 15 | 15 | 11 | 13 | 16 | 10 | 15 | 10 | 12 | 0.875539 | 0.976600 | LONG-RUN | 3 |
| 16 | 10 | 6 | 20 | 13 | 8 | 9 | 17 | 14 | 15 | 0.082177 | 0.992200 | RANK | 1 |
| 16 | 13 | 12 | 10 | 10 | 17 | 13 | 17 | 14 | 6 | 0.378138 | 1.000000 | FFT | 0 |
| 15 | 11 | 17 | 12 | 10 | 12 | 11 | 11 | 12 | 17 | 0.788728 | 0.992200 | APERIODIC-TEMPLATE | 1 |
| 10 | 19 | 9 | 17 | 8 | 10 | 14 | 15 | 14 | 12 | 0.324180 | 1.000000 | APERIODIC-TEMPLATE | 0 |
| 7 | 10 | 10 | 15 | 11 | 18 | 23 | 9 | 13 | 12 | 0.041438 | 0.992200 | APERIODIC-TEMPLATE | 1 |
| 11 | 9 | 15 | 15 | 15 | 12 | 18 | 14 | 8 | 11 | 0.551026 | 0.992200 | APERIODIC-TEMPLATE | 1 |
| 9 | 9 | 11 | 18 | 14 | 10 | 16 | 11 | 7 | 23 | 0.026648 | 0.984400 | APERIODIC-TEMPLATE | 2 |
| 17 | 13 | 13 | 8 | 4 | 22 | 15 | 12 | 12 | 12 | 0.035174 | 0.992200 | APERIODIC-TEMPLATE | 1 |
| 10 | 13 | 14 | 21 | 11 | 8 | 16 | 10 | 13 | 12 | 0.299251 | 0.986600 | APERIODIC-TEMPLATE | 3 |
| 15 | 16 | 11 | 15 | 10 | 8 | 13 | 20 | 15 | 5 | 0.095617 | 0.992200 | APERIODIC-TEMPLATE | 2 |
| 8 | 14 | 14 | 14 | 14 | 10 | 16 | 17 | 8 | 13 | 0.551026 | 1.000000 | APERIODIC-TEMPLATE | 0 |
| 14 | 9 | 6 | 18 | 18 | 14 | 13 | 7 | 14 | 15 | 0.134686 | 1.000000 | APERIODIC-TEMPLATE | 0 |
| 17 | 13 | 14 | 12 | 8 | 8 | 10 | 16 | 22 | 18 | 0.033288 | 0.992200 | APERIODIC-TEMPLATE | 1 |
| 15 | 10 | 10 | 13 | 9 | 13 | 16 | 18 | 10 | 12 | 0.500934 | 0.976600 | APERIODIC-TEMPLATE | 3 |
| 12 | 13 | 13 | 12 | 15 | 8 | 12 | 12 | 16 | 12 | 0.888137 | 0.992200 | APERIODIC-TEMPLATE | 1 |
| 12 | 14 | 11 | 8 | 16 | 20 | 11 | 14 | 8 | 14 | 0.311542 | 0.992200 | APERIODIC-TEMPLATE | 1 |
| 12 | 14 | 13 | 17 | 15 | 13 | 9 | 11 | 15 | 9 | 0.772760 | 0.992200 | APERIODIC-TEMPLATE | 1 |
| 13 | 9 | 16 | 13 | 9 | 14 | 12 | 15 | 15 | 12 | 0.848588 | 0.976600 | APERIODIC-TEMPLATE | 3 |
| 20 | 12 | 12 | 16 | 13 | 14 | 7 | 9 | 10 | 15 | 0.275709 | 0.984400 | APERIODIC-TEMPLATE | 2 |
| 8 | 18 | 18 | 7 | 18 | 11 | 11 | 13 | 16 | 8 | 0.082177 | 0.984400 | APERIODIC-TEMPLATE | 2 |
| 11 | 18 | 13 | 7 | 17 | 15 | 11 | 18 | 9 | 9 | 0.178278 | 0.992200 | APERIODIC-TEMPLATE | 1 |
| 19 | 10 | 7 | 16 | 9 | 16 | 15 | 10 | 18 | 8 | 0.082177 | 0.976600 | APERIODIC-TEMPLATE | 3 |

FIG. 6A

| | | | | | | | | | | | | | |
|---|---|---|---|---|---|---|---|---|---|---|---|---|---|
| 13 | 13 | 15 | 8 | 12 | 10 | 12 | 11 | 14 | 20 | 0.500934 | – | APERIODIC-TEMPLATE – | 1 |
| 9 | 14 | 18 | 14 | 20 | 3 | 13 | 11 | 15 | 11 | 0.041438 | – | APERIODIC-TEMPLATE – | 1 |
| 9 | 11 | 17 | 14 | 13 | 14 | 7 | 14 | 13 | 16 | 0.585209 | – | APERIODIC-TEMPLATE – | 0 |
| 12 | 15 | 10 | 12 | 12 | 16 | 7 | 10 | 15 | 19 | 0.378138 | – | APERIODIC-TEMPLATE – | 0 |
| 13 | 13 | 10 | 15 | 13 | 11 | 18 | 13 | 13 | 9 | 0.804337 | – | APERIODIC-TEMPLATE – | 2 |
| 9 | 7 | 6 | 17 | 18 | 11 | 22 | 16 | 10 | 12 | 0.012650 | – | APERIODIC-TEMPLATE – | 1 |
| 13 | 15 | 12 | 15 | 8 | 12 | 15 | 10 | 13 | 15 | 0.848522 | – | APERIODIC-TEMPLATE – | 3 |
| 9 | 10 | 9 | 14 | 17 | 13 | 10 | 18 | 12 | 16 | 0.437274 | – | APERIODIC-TEMPLATE – | 0 |
| 12 | 14 | 13 | 11 | 18 | 13 | 9 | 12 | 13 | 13 | 0.875539 | – | APERIODIC-TEMPLATE – | 0 |
| 9 | 15 | 14 | 11 | 8 | 14 | 13 | 10 | 13 | 11 | 0.585209 | – | APERIODIC-TEMPLATE – | 3 |
| 13 | 10 | 14 | 15 | 14 | 16 | 10 | 13 | 15 | 8 | 0.772760 | – | APERIODIC-TEMPLATE – | 1 |
| 18 | 11 | 15 | 11 | 17 | 11 | 11 | 17 | 9 | 8 | 0.324180 | – | APERIODIC-TEMPLATE – | 2 |
| 7 | 15 | 19 | 8 | 21 | 14 | 12 | 12 | 10 | 10 | 0.066882 | – | APERIODIC-TEMPLATE – | 0 |
| 14 | 14 | 12 | 14 | 9 | 15 | 11 | 14 | 13 | 12 | 0.964295 | – | APERIODIC-TEMPLATE – | 2 |
| 10 | 11 | 12 | 10 | 13 | 11 | 14 | 17 | 15 | 15 | 0.848588 | – | APERIODIC-TEMPLATE – | 1 |
| 15 | 7 | 14 | 16 | 13 | 13 | 8 | 16 | 14 | 12 | 0.568055 | – | APERIODIC-TEMPLATE – | 0 |
| 16 | 14 | 15 | 10 | 10 | 12 | 8 | 15 | 15 | 13 | 0.739918 | – | APERIODIC-TEMPLATE – | 2 |
| 10 | 11 | 16 | 13 | 15 | 16 | 9 | 11 | 10 | 17 | 0.619772 | – | APERIODIC-TEMPLATE – | 0 |
| 17 | 13 | 16 | 10 | 11 | 8 | 9 | 13 | 10 | 21 | 0.155209 | – | APERIODIC-TEMPLATE – | 1 |
| 14 | 14 | 15 | 9 | 19 | 7 | 17 | 9 | 13 | 11 | 0.253551 | – | APERIODIC-TEMPLATE – | 0 |
| 13 | 10 | 10 | 18 | 10 | 13 | 18 | 11 | 12 | 13 | 0.602458 | – | APERIODIC-TEMPLATE – | 0 |
| 12 | 14 | 10 | 20 | 10 | 25 | 11 | 3 | 8 | 15 | 0.000569 | – | APERIODIC-TEMPLATE – | 3 |
| 16 | 9 | 10 | 15 | 12 | 13 | 20 | 15 | 10 | 8 | 0.275709 | – | APERIODIC-TEMPLATE – | 2 |
| 13 | 11 | 14 | 10 | 13 | 12 | 13 | 14 | 14 | 14 | 0.991468 | – | APERIODIC-TEMPLATE – | 0 |
| 16 | 15 | 6 | 12 | 13 | 8 | 11 | 15 | 18 | 12 | 0.324180 | – | APERIODIC-TEMPLATE – | 2 |
| 10 | 12 | 15 | 12 | 8 | 12 | 10 | 15 | 17 | 16 | 0.671779 | – | APERIODIC-TEMPLATE – | 1 |
| 11 | 8 | 9 | 15 | 13 | 20 | 25 | 20 | 11 | 11 | 0.116519 | – | APERIODIC-TEMPLATE – | 2 |
| 14 | 6 | 11 | 10 | 16 | 7 | 12 | 14 | 14 | 11 | 0.008879 | – | APERIODIC-TEMPLATE – | 1 |
| 10 | 13 | 12 | 11 | 9 | 17 | 12 | 17 | 18 | 9 | 0.422034 | – | APERIODIC-TEMPLATE – | 1 |

FIG. 6B

| | | | | | | | | | | | | | |
|---|---|---|---|---|---|---|---|---|---|---|---|---|---|
| 14 | 13 | 14 | 9 | 16 | 9 | 9 | 16 | 15 | 16 | 13 | 0.689019 | 0.992200 | APERIODIC-TEMPLATE - 1 |
| 12 | 14 | 10 | 14 | 9 | 7 | 7 | 9 | 17 | 13 | 15 | 0.452799 | 0.992200 | APERIODIC-TEMPLATE - 1 |
| 20 | 12 | 15 | 13 | 7 | 11 | 14 | 11 | 10 | 11 | 15 | 0.364146 | 0.976600 | APERIODIC-TEMPLATE - 3 |
| 11 | 20 | 8 | 9 | 15 | 15 | 14 | 12 | 10 | 12 | 14 | 0.350485 | 0.992200 | APERIODIC-TEMPLATE - 1 |
| 13 | 15 | 11 | 11 | 19 | 11 | 12 | 16 | 11 | 16 | 9 | 0.602458 | 0.992200 | APERIODIC-TEMPLATE - 1 |
| 11 | 14 | 15 | 10 | 18 | 9 | 9 | 10 | 0 | 10 | 6 | 0.074177 | 0.992200 | APERIODIC-TEMPLATE - 1 |
| 5 | 15 | 9 | 19 | 13 | 14 | 14 | 11 | 14 | 11 | 10 | 0.128379 | 1.000000 | APERIODIC-TEMPLATE - 0 |
| 14 | 15 | 12 | 16 | 11 | 13 | 13 | 9 | 12 | 13 | 11 | 0.970538 | 0.984400 | APERIODIC-TEMPLATE - 2 |
| 9 | 18 | 0 | 10 | 9 | 9 | 9 | 0 | 16 | 7 | 18 | 0.074177 | 0.984400 | APERIODIC-TEMPLATE - 2 |
| 7 | 11 | 17 | 10 | 0 | 10 | 0 | 10 | 11 | 13 | 15 | 0.602458 | 0.992200 | APERIODIC-TEMPLATE - 1 |
| 8 | 13 | 13 | 12 | 9 | 13 | 10 | 12 | 13 | 18 | 19 | 0.364146 | 0.992200 | APERIODIC-TEMPLATE - 1 |
| 13 | 14 | 16 | 10 | 10 | 10 | 0 | 18 | 18 | 0 | 18 | 0.585209 | 0.992200 | APERIODIC-TEMPLATE - 1 |
| 9 | 21 | 14 | 8 | 12 | 8 | 8 | 10 | 0 | 9 | 14 | 0.186566 | 0.992200 | APERIODIC-TEMPLATE - 1 |
| 7 | 13 | 16 | 16 | 18 | 12 | 12 | 9 | 9 | 11 | 10 | 0.392456 | 0.992200 | APERIODIC-TEMPLATE - 1 |
| 16 | 18 | 12 | 13 | 10 | 12 | 9 | 15 | 10 | 14 | 15 | 0.213309 | 0.992200 | APERIODIC-TEMPLATE - 1 |
| 9 | 16 | 17 | 13 | 8 | 9 | 13 | 13 | 18 | 17 | 13 | 0.602458 | 1.000000 | APERIODIC-TEMPLATE - 0 |
| 13 | 16 | 11 | 12 | 12 | 13 | 13 | 15 | 14 | 14 | 12 | 0.941144 | 0.984400 | APERIODIC-TEMPLATE - 2 |
| 11 | 13 | 16 | 11 | 9 | 8 | 8 | 16 | 15 | 17 | 14 | 0.602458 | 1.000000 | APERIODIC-TEMPLATE - 0 |
| 15 | 14 | 12 | 14 | 12 | 12 | 12 | 7 | 17 | 18 | 8 | 0.689019 | 0.992200 | APERIODIC-TEMPLATE - 1 |
| 11 | 12 | 12 | 13 | 17 | 11 | 11 | 15 | 9 | 11 | 10 | 0.619772 | 0.984400 | APERIODIC-TEMPLATE - 2 |
| 18 | 10 | 15 | 11 | 7 | 19 | 19 | 16 | 11 | 13 | 14 | 0.452799 | 1.000000 | APERIODIC-TEMPLATE - 0 |
| 20 | 9 | 15 | 20 | 15 | 9 | 9 | 7 | 8 | 11 | 7 | 0.178278 | 1.000000 | APERIODIC-TEMPLATE - 0 |
| 8 | 12 | 13 | 17 | 16 | 13 | 13 | 15 | 17 | 20 | 16 | 0.275709 | 0.976600 | APERIODIC-TEMPLATE - 3 |
| 9 | 12 | 17 | 9 | 12 | 7 | 7 | 16 | 9 | 17 | 10 | 0.204076 | 1.000000 | APERIODIC-TEMPLATE - 0 |
| 12 | 13 | 15 | 12 | 17 | 16 | 16 | 12 | 11 | 9 | 12 | 0.619772 | 0.984400 | APERIODIC-TEMPLATE - 2 |
| 15 | 11 | 17 | 13 | 9 | 13 | 13 | 17 | 8 | 12 | 17 | 0.739918 | 0.992200 | APERIODIC-TEMPLATE - 1 |
| 13 | 12 | 11 | 11 | 16 | 7 | 7 | 9 | 17 | 13 | 17 | 0.619772 | 0.992200 | APERIODIC-TEMPLATE - 1 |
| 8 | 11 | 14 | 13 | 13 | 16 | 16 | 13 | 10 | 11 | 9 | 0.287306 | 1.000000 | APERIODIC-TEMPLATE - 0 |

FIG. 6C

| | | | | | | | | | | | | |
|---|---|---|---|---|---|---|---|---|---|---|---|---|
| 13 | 13 | 15 | 16 | 7 | 12 | 12 | 9 | 16 | 15 | 0.619772 | APERIODIC-TEMPLATE | 1 |
| 12 | 16 | 12 | 8 | 11 | 10 | 14 | 18 | 18 | 9 | 0.337162 | APERIODIC-TEMPLATE | 1 |
| 10 | 12 | 8 | 13 | 6 | 14 | 15 | 13 | 22 | 15 | 0.090936 | APERIODIC-TEMPLATE | 1 |
| 8 | 12 | 11 | 8 | 21 | 18 | 15 | 7 | 15 | 8 | 0.063482 | APERIODIC-TEMPLATE | 0 |
| 16 | 16 | 11 | 11 | 10 | 12 | 11 | 16 | 13 | 15 | 0.671779 | APERIODIC-TEMPLATE | 4 |
| 11 | 9 | 15 | 12 | 15 | 14 | 14 | 15 | 11 | 13 | 0.911413 | APERIODIC-TEMPLATE | 0 |
| 9 | 14 | 9 | 18 | 15 | 14 | 11 | 16 | 12 | 16 | 0.772760 | APERIODIC-TEMPLATE | 1 |
| 11 | 9 | 13 | 8 | 7 | 15 | 13 | 13 | 14 | 15 | 0.534146 | APERIODIC-TEMPLATE | 1 |
| 17 | 12 | 15 | 11 | 11 | 13 | 14 | 15 | 13 | 10 | 0.756476 | APERIODIC-TEMPLATE | 1 |
| 13 | 10 | 18 | 10 | 7 | 10 | 11 | 16 | 16 | 18 | 0.195163 | APERIODIC-TEMPLATE | 1 |
| 17 | 10 | 8 | 15 | 9 | 7 | 9 | 17 | 12 | 20 | 0.043745 | APERIODIC-TEMPLATE | 2 |
| 10 | 7 | 13 | 10 | 16 | 14 | 18 | 15 | 13 | 11 | 0.723129 | APERIODIC-TEMPLATE | 2 |
| 11 | 14 | 13 | 11 | 10 | 13 | 14 | 12 | 4 | 22 | 0.025193 | APERIODIC-TEMPLATE | 1 |
| 14 | 9 | 10 | 16 | 15 | 12 | 19 | 12 | 18 | 15 | 0.739918 | APERIODIC-TEMPLATE | 0 |
| 16 | 14 | 12 | 12 | 7 | 11 | 17 | 19 | 13 | 9 | 0.337162 | APERIODIC-TEMPLATE | 4 |
| 18 | 0 | 8 | 14 | 19 | 0 | 15 | 17 | 15 | 11 | 0.148094 | APERIODIC-TEMPLATE | 1 |
| 16 | 9 | 10 | 19 | 12 | 13 | 21 | 13 | 16 | 14 | 0.888137 | APERIODIC-TEMPLATE | 0 |
| 13 | 17 | 13 | 8 | 9 | 12 | 17 | 14 | 9 | 14 | 0.848588 | APERIODIC-TEMPLATE | 4 |
| 8 | 13 | 15 | 11 | 11 | 14 | 12 | 9 | 13 | 11 | 0.500934 | APERIODIC-TEMPLATE | 1 |
| 11 | 19 | 13 | 11 | 15 | 11 | 15 | 12 | 11 | 15 | 0.602458 | APERIODIC-TEMPLATE | 2 |
| 8 | 13 | 14 | 13 | 11 | 17 | 21 | 10 | 17 | 13 | 0.364146 | APERIODIC-TEMPLATE | 2 |
| 11 | 14 | 15 | 11 | 18 | 15 | 17 | 12 | 11 | 12 | 0.484646 | APERIODIC-TEMPLATE | 1 |
| 13 | 13 | 17 | 10 | 10 | 21 | 12 | 13 | 15 | 12 | 0.931952 | APERIODIC-TEMPLATE | 0 |
| 8 | 15 | 11 | 13 | 10 | 17 | 17 | 12 | 15 | 11 | 0.311542 | APERIODIC-TEMPLATE | 2 |
| 9 | 12 | 16 | 11 | 12 | 12 | 12 | 13 | 14 | 13 | 0.788728 | APERIODIC-TEMPLATE | 1 |
| 13 | 12 | 14 | 10 | 12 | 15 | 15 | 11 | 13 | 15 | 0.995711 | APERIODIC-TEMPLATE | 0 |
| 8 | 14 | 19 | 13 | 11 | 16 | 21 | 15 | 16 | 14 | 0.364146 | APERIODIC-TEMPLATE | 2 |
| 14 | 17 | 7 | 12 | 15 | 20 | 16 | 14 | 8 | 15 | 0.195163 | APERIODIC-TEMPLATE | 4 |

| | | | | | | | | | | | | | |
|---|---|---|---|---|---|---|---|---|---|---|---|---|---|
| 14 | 9 | 12 | 12 | 14 | 19 | 14 | 13 | 7 | 14 | 0.500934 | 1.000000 | - APERIODIC-TEMPLATE - | 0 |
| 19 | 5 | 13 | 12 | 14 | 18 | 12 | 9 | 15 | 11 | 0.155209 | 0.992200 | - APERIODIC-TEMPLATE - | 1 |
| 16 | 14 | 7 | 15 | 15 | 11 | 14 | 13 | 8 | 15 | 0.551026 | 1.000000 | - APERIODIC-TEMPLATE - | 0 |
| 17 | 16 | 9 | 16 | 9 | 13 | 10 | 13 | 15 | 10 | 0.551026 | 0.968800 | - APERIODIC-TEMPLATE - | 4 |
| 20 | 12 | 6 | 18 | 11 | 16 | 11 | 14 | 13 | 7 | 0.082177 | 0.976600 | - APERIODIC-TEMPLATE - | 3 |
| 11 | 13 | 13 | 13 | 9 | 14 | 19 | 11 | 14 | 12 | 0.956476 | 0.984400 | - APERIODIC-TEMPLATE - | 2 |
| 16 | 12 | 14 | 7 | 9 | 15 | 4 | 14 | 8 | 18 | 0.324180 | 0.984400 | - APERIODIC-TEMPLATE - | 2 |
| 7 | 13 | 13 | 21 | 10 | 10 | 9 | 11 | 17 | 11 | 0.054199 | 0.992200 | - APERIODIC-TEMPLATE - | 1 |
| 11 | 19 | 9 | 6 | 15 | 19 | 8 | 18 | 14 | 19 | 0.033288 | 1.000000 | - APERIODIC-TEMPLATE - | 0 |
| 14 | 9 | 9 | 10 | 12 | 15 | 16 | 12 | 15 | 17 | 0.568055 | 0.992200 | - APERIODIC-TEMPLATE - | 1 |
| 12 | 8 | 11 | 11 | 11 | 15 | 17 | 13 | 12 | 13 | 0.949602 | 0.984400 | - APERIODIC-TEMPLATE - | 2 |
| 18 | 13 | 11 | 11 | 20 | 13 | 7 | 9 | 10 | 15 | 0.204076 | 0.968800 | - APERIODIC-TEMPLATE - | 4 |
| 14 | 13 | 13 | 9 | 13 | 15 | 18 | 9 | 9 | 16 | 0.551026 | 0.992200 | - APERIODIC-TEMPLATE - | 1 |
| 11 | 12 | 18 | 14 | 14 | 11 | 15 | 10 | 10 | 15 | 0.706149 | 0.976600 | - APERIODIC-TEMPLATE - | 3 |
| 4 | 10 | 10 | 11 | 18 | 15 | 18 | 11 | 11 | 12 | 0.074177 | 1.000000 | - APERIODIC-TEMPLATE - | 0 |
| 11 | 18 | 13 | 16 | 20 | 8 | 20 | 9 | 12 | 11 | 0.074177 | 1.000000 | - APERIODIC-TEMPLATE - | 0 |
| 14 | 8 | 10 | 9 | 11 | 15 | 15 | 13 | 17 | 15 | 0.671779 | 0.984400 | - APERIODIC-TEMPLATE - | 2 |
| 5 | 9 | 15 | 15 | 10 | 15 | 19 | 9 | 11 | 14 | 0.178278 | 1.000000 | - APERIODIC-TEMPLATE - | 0 |
| 10 | 15 | 7 | 13 | 10 | 9 | 16 | 13 | 12 | 19 | 0.155209 | 1.000000 | - APERIODIC-TEMPLATE - | 0 |
| 13 | 19 | 9 | 16 | 13 | 15 | 17 | 14 | 9 | 8 | 0.551026 | 0.992200 | - APERIODIC-TEMPLATE - | 1 |
| 16 | 14 | 12 | 16 | 12 | 12 | 9 | 13 | 11 | 17 | 0.7339918 | 0.992200 | - APERIODIC-TEMPLATE - | 1 |
| 12 | 10 | 11 | 8 | 20 | 13 | 10 | 9 | 18 | 14 | 0.253551 | 1.000000 | - APERIODIC-TEMPLATE - | 0 |
| 13 | 13 | 15 | 14 | 13 | 14 | 12 | 16 | 10 | 10 | 0.931952 | 0.984400 | - APERIODIC-TEMPLATE - | 2 |
| 17 | 11 | 12 | 7 | 15 | 16 | 19 | 10 | 9 | 10 | 0.222869 | 0.992200 | - APERIODIC-TEMPLATE - | 1 |
| 9 | 13 | 14 | 15 | 11 | 17 | 14 | 14 | 11 | 13 | 0.819544 | 1.000000 | - APERIODIC-TEMPLATE - | 2 |
| 10 | 10 | 19 | 7 | 15 | 18 | 10 | 13 | 11 | 8 | 0.116519 | 1.000000 | - APERIODIC-TEMPLATE - | 0 |
| 15 | 17 | 19 | 18 | 6 | 11 | 17 | 9 | 10 | 14 | 0.086458 | 0.984400 | - APERIODIC-TEMPLATE - | 2 |
| 10 | 9 | 9 | 15 | 11 | 14 | 17 | 16 | 6 | 14 | 0.324180 | 0.992200 | - APERIODIC-TEMPLATE - | 1 |
| 12 | 16 | 11 | 8 | 16 | 11 | 15 | 13 | 16 | 15 | 0.756476 | 1.000000 | - APERIODIC-TEMPLATE - | 0 |
| 15 | 11 | 9 | 14 | 12 | 14 | 11 | 9 | 14 | 13 | 0.788728 | 0.992200 | - APERIODIC-TEMPLATE - | 1 |
| 10 | 17 | 16 | 10 | 14 | 13 | 16 | 16 | 16 | 11 | 0.392456 | 0.992200 | - APERIODIC-TEMPLATE - | 1 |

| C1 | C2 | C3 | C4 | C5 | C6 | C7 | C8 | C9 | C10 | P-value | Proportion | Test | Idx |
|---|---|---|---|---|---|---|---|---|---|---|---|---|---|
| 13 | 6 | 14 | 14 | 13 | 12 | 18 | 13 | 13 | 12 | 0.637119 | 1.000000 | APERIODIC-TEMPLATE | 0 |
| 19 | 14 | 12 | 15 | 17 | 17 | 7 | 8 | 9 | 10 | 0.128379 | 0.992200 | APERIODIC-TEMPLATE | 1 |
| 19 | 8 | 12 | 9 | 11 | 16 | 18 | 13 | 10 | 12 | 0.275709 | 0.984400 | APERIODIC-TEMPLATE | 2 |
| 14 | 14 | 12 | 15 | 12 | 12 | 13 | 15 | 11 | 10 | 0.976060 | 1.000000 | APERIODIC-TEMPLATE | 0 |
| 11 | 12 | 12 | 16 | 10 | 14 | 13 | 12 | 12 | 16 | 0.941144 | 1.000000 | APERIODIC-TEMPLATE | 0 |
| 13 | 14 | 12 | 10 | 16 | 11 | 12 | 11 | 18 | 11 | 0.804337 | 0.992200 | APERIODIC-TEMPLATE | 1 |
| 17 | 14 | 6 | 15 | 13 | 18 | 16 | 12 | 12 | 5 | 0.100508 | 0.992200 | APERIODIC-TEMPLATE | 1 |
| 18 | 15 | 9 | 13 | 10 | 9 | 14 | 18 | 9 | 13 | 0.364146 | 0.984400 | APERIODIC-TEMPLATE | 2 |
| 16 | 9 | 11 | 16 | 13 | 14 | 10 | 11 | 21 | 7 | 0.155209 | 0.992200 | APERIODIC-TEMPLATE | 2 |
| 14 | 11 | 11 | 10 | 14 | 10 | 10 | 15 | 15 | 18 | 0.706149 | 0.992200 | APERIODIC-TEMPLATE | 1 |
| 12 | 12 | 15 | 9 | 17 | 9 | 17 | 14 | 10 | 12 | 0.619722 | 0.984400 | APERIODIC-TEMPLATE | 2 |
| 13 | 13 | 11 | 10 | 16 | 11 | 12 | 9 | 17 | 18 | 0.551026 | 0.976600 | PERIODIC-TEMPLATE | 3 |
| 15 | 11 | 14 | 10 | 11 | 14 | 8 | 18 | 10 | 9 | 0.253551 | 0.984400 | UNIVERSAL | 2 |
| 9 | 19 | 13 | 12 | 11 | 12 | 12 | 11 | 21 | 14 | 0.517442 | 1.000000 | APEN | 0 |
| 13 | 13 | 7 | 9 | 5 | 9 | 8 | 14 | 4 | 6 | 0.227773 | 0.964300 | RANDOM-EXCURSION | 3 |
| 8 | 9 | 6 | 6 | 13 | 6 | 9 | 12 | 7 | 8 | 0.637119 | 0.988100 | RANDOM-EXCURSION | 1 |
| 5 | 9 | 12 | 10 | 6 | 13 | 5 | 12 | 5 | 6 | 0.186566 | 0.988100 | RANDOM-EXCURSION | 1 |
| 6 | 10 | 9 | 10 | 13 | 9 | 7 | 6 | 9 | 7 | 0.509162 | 1.000000 | RANDOM-EXCURSION | 0 |
| 7 | 5 | 9 | 8 | 10 | 8 | 7 | 13 | 9 | 7 | 0.855534 | 0.988100 | RANDOM-EXCURSION | 1 |
| 7 | 6 | 8 | 5 | 8 | 13 | 7 | 14 | 6 | 10 | 0.311542 | 1.000000 | RANDOM-EXCURSION | 0 |
| 10 | 6 | 8 | 7 | 7 | 9 | 13 | 4 | 9 | 9 | 0.714660 | 0.988100 | RANDOM-EXCURSION-V | 1 |
| 6 | 8 | 8 | 6 | 7 | 10 | 5 | 9 | 13 | 13 | 0.414525 | 0.988100 | RANDOM-EXCURSION-V | 1 |
| 6 | 7 | 13 | 9 | 8 | 8 | 11 | 8 | 11 | 6 | 0.941144 | 0.988100 | RANDOM-EXCURSION-V | 0 |
| 7 | 9 | 7 | 6 | 7 | 10 | 12 | 10 | 7 | 8 | 0.437274 | 0.988100 | RANDOM-EXCURSION-V | 1 |
| 7 | 4 | 13 | 6 | 5 | 13 | 9 | 10 | 11 | 9 | 0.637119 | 1.000000 | RANDOM-EXCURSION-V | 0 |
| 5 | 7 | 4 | 1 | 6 | 12 | 6 | 11 | 11 | 10 | 0.061841 | 1.000000 | RANDOM-EXCURSION-V | 0 |
| 6 | 9 | 8 | 7 | 10 | 6 | 9 | 11 | 8 | 13 | 0.484646 | 1.000000 | RANDOM-EXCURSION-V | 0 |
| 5 | 10 | 9 | 6 | 9 | 4 | 13 | 13 | 9 | 8 | 0.330628 | 1.000000 | RANDOM-EXCURSION-V | 0 |
| 8 | 9 | 10 | 5 | 16 | 8 | 9 | 13 | 7 | 5 | 0.072289 | 0.988100 | RANDOM-EXCURSION-V | 1 |
| 12 | 4 | 10 | 10 | 4 | 7 | 9 | 12 | 6 | 9 | 0.437274 | 0.988100 | RANDOM-EXCURSION-V | 1 |

| | | | | | | | | | |
|---|---|---|---|---|---|---|---|---|---|
| 11 | 9 | 14 | 4 | 10 | 6 | 12 | 4 | 8 | 0.151616 - 0.988100 - RANDOM-EXCURSION-V 1 |
| 11 | 5 | 6 | 7 | 8 | 10 | 15 | 8 | 8 | 0.350485 - 0.976200 - RANDOM-EXCURSION-V 2 |
| 8 | 2 | 11 | 6 | 13 | 5 | 9 | 9 | 7 | 0.084294 - 0.0976200 - RANDOM-EXCURSION-V 2 |
| 7 | 3 | 6 | 7 | 6 | 12 | 12 | 10 | 8 | 0.162606 - 0.988100 - RANDOM-EXCURSION-V 1 |
| 7 | 9 | 6 | 3 | 9 | 13 | 7 | 8 | 12 | 0.371101 - 1.000000 - RANDOM-EXCURSION-V 0 |
| 8 | 8 | 9 | 12 | 9 | 6 | 7 | 10 | 11 | 0.875539 - 1.000000 - RANDOM-EXCURSION-V 0 |
| 9 | 11 | 9 | 9 | 3 | 5 | 10 | 10 | 3 | 0.637119 - 1.000000 - RANDOM-EXCURSION-V 0 |
| 10 | 11 | 9 | 11 | 3 | 6 | 7 | 11 | 9 | 0.534146 - 1.000000 - RANDOM-EXCURSION-V 0 |
| 8 | 11 | 10 | 7 | 9 | 8 | 7 | 4 | 12 | 0.141256 - 0.988100 - RANDOM-EXCURSION-V 1 |
| 6 | 12 | 6 | 8 | 12 | 8 | 6 | 11 | 9 | 0.834308 - 0.988100 - RANDOM-EXCURSION-V 1 |
| 9 | 12 | 18 | 8 | 20 | 15 | 10 | 18 | 18 | 0.141256 - 0.992200 - SERIAL 0 |
| 8 | 12 | 8 | 12 | 0 | 11 | 11 | 16 | 15 | 0.275709 - 1.000000 - SERIAL 0 |
| 0 | 0 | 0 | 0 | 0 | 0 | 0 | 0 | 128 | 0.000000 - 1.000000 - LEMPEL-ZIV 0 |
| 15 | 14 | 10 | 10 | 12 | 9 | 17 | 17 | 10 | 0.602458 - 0.992200 - LINEAR-COMPLEXITY 1 |

NUMBER OF BITSTREAMS     128      220

ALPHA     0.01

1.016384

0.963616

NUMBER OF BITSTREAMS (RANDOM-EXCURSION & VARIENT)     84

ALPHA     0.01

1.022569

0.957431

NUMBER OF FAILS:     1     0

NUMBER OF FAILS IGNORING LEMPEL- ZIV:     0     0

FIG. 6

| 6A | 6B | 6C | 6D | 6E | 6F | 6G |
|---|---|---|---|---|---|---|

MEMORY ENCRYPTION FOR DIGITAL VIDEO

FIELD OF THE INVENTION

The present invention relates to encryption generally and, more particularly, to memory encryption for digital video.

BACKGROUND OF THE INVENTION

Content providers are concerned about the security of products (i.e., video content and audio content) delivered by digital media (i.e., DVDs). Without protection, the digital media content can be copied almost flawlessly allowing high quality pirated DVDs, computer files and the like. Systems for encrypting the output signals of DVD players and set-top-boxes, such as High-bandwidth Digital Content Protection (HDCP), have been defined. However, inside the DVD players and the set-top-boxes, a chip that performs the video decoding (typically according to MPEG or similar encoding standards) will place decoded images that are not encrypted into an external memory chip. Dedicated adversaries can recover unencrypted picture sequences by analyzing the data that the decoder chips write into the connected external memory chips.

To decode the video data, areas of previously decoded images stored in the external memory are accessible on demand, the accesses being essentially at random. The random access behavior precludes using many conventional encryption methods that encrypt large blocks of data. Whenever even a small part of an encrypted block is accessed, the whole encrypted block is read from external memory and decrypted. The memory bandwidth consumed moving the encrypted blocks back and forth prevents the block encryption from being a viable approach. For example, Mike Frantzen and Brian Koehl of Purdue University disclose a large block (i.e., cache-block sized blocks of data) encryption approach in a paper "Encrypting off Processor Memory", December 2000, http://www.w4g.org/ee565.html. However, the Frantzen and Koehl approach does not access small areas of image data accessed in random to form predictions.

SUMMARY OF THE INVENTION

The present invention concerns a method for protecting data between a circuit and a memory. The method generally comprises the steps of (A) generating a particular address among a plurality of addresses for accessing a particular area among a plurality of areas in the memory, (B) determining a particular key among a plurality of keys associated with the particular area, (C) generating a cipher stream from both the particular address and the particular key and (D) modifying a data item with the cipher stream such that the data item is encrypted during a transfer between the circuit and the memory.

The objects, features and advantages of the present invention include providing memory encryption for digital video that may (i) use a Digital Encryption Standard block cipher to provide "fragments" of a cipher, (ii) randomly access an external memory to recover encrypted data, (iii) use well known cryptographic components for cipher generation, (iv) minimize additional access latency to the external memory and/or (v) achieve an encryption scheme that may not be compromised even if an attacker had access to all documentation for the hardware of the chip, the end equipment incorporating the chip and the associated software.

BRIEF DESCRIPTION OF THE DRAWINGS

These and other objects, features and advantages of the present invention will be apparent from the following detailed description and the appended claims and drawings in which:

FIGS. 6A-6G are a spreadsheet of an STS report from a Data Encryption Standard engine testing.

DETAILED DESCRIPTION OF THE PREFERRED EMBODIMENTS

The present invention generally encrypts data stored in external memory chips (e.g., dynamic random access memory (DRAM)). The encryption may use multiple keys, where a different key is used for different areas of the memory. Furthermore, the keys may be changed periodically to limit content exposure if a key is discovered. The encryption circuitry and method may be useful for protecting all data types. For example, video data, audio data, text, graphics and/or computer programs may be safely stored in a memory chip susceptible to an attack. In various embodiments, the present invention may be applied to digital versatile disk (DVD), set-top box (STB), integrated digital televisions and broadcast encoder equipment to prevent (or at least seriously hamper) unauthorized copying of decoded content while still in digital form.

Consider a 2-hour movie that has encrypted video frames targeted for unauthorized copying. Assuming that (i) approximately a thousand frame-times may be used to determine a key for an encrypted video and (ii) the key is applied over all of the movie, then an overall time to decrypt the movie may take less than a day. However, if each portion of the movie (e.g., 100 frames or about 4 seconds) has a different key, cracking 1,800 keys may take several weeks making theft of the movie difficult.

Conventional processes for decoding digital video signals generally read very small amounts of data from a frame store held in a memory in order to form predictions. The memory is generally fabricated on (or in) a separate chip from the decoder circuitry and thus may be referred to as an external memory. The external memory may be implemented as a dynamic random access memory (DRAM) In various embodiments, the external memory may comprise a double data rate (DDR) memory. The external memory generally stores data as 16-bit words, 32-bit words or 64-bit words. Other word sizes may be implemented to meet the criteria of a particular application. Furthermore, in other embodiments, the data may be divided into multiple (e.g., two) words, each an equal fraction of a total width, where each fraction may be separately addressed. For data divided into two words, the halves may be referred to as "left" and "right".

Figure 1:
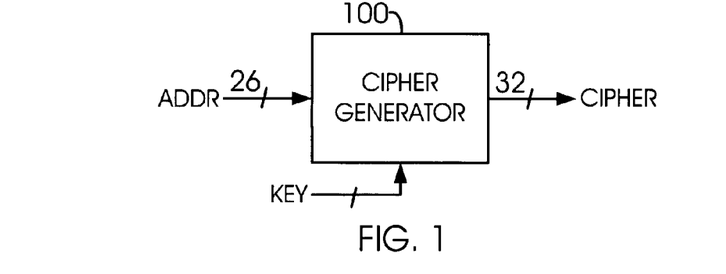
FIG. 1 is a diagram of a cipher generator.

Referring to FIG. 1, a diagram of a cipher generator 100 is shown. The cipher generator 100 may receive an input signal (e.g., ADDR) carrying a value (e.g., an address value) to be encrypted. A key signal (e.g., KEY) having a key value may be used by the cipher generator 100 to perform the encryption of the address value. The encrypted address value may be presented by the cipher generator 100 as a cipher stream in an output signal (e.g., CIPHER). The cipher generator 100 is generally implemented as a hardware-only circuit. In one embodiment, the cipher generator 100 may be implemented with both hardware and software components.

The cipher stream, as originally generated, may have more bits than may be useful. For example, the cipher stream may be created having, 64 bits where only 32 bits may be presented in the signal CIPHER. Therefore, fragments of the cipher stream may be useful for encryption and/or decryption. The cipher generator 100 may be functional to (i) map a DRAM address for the external memory to a cipher stream and (ii) reduce the cipher stream down to an atomic level of the data words (e.g., 32-bits or 64-bits) in the external memory. As used herein, "atomic level" generally refers to a smallest individually addressable unit of data. An atomic size may be at least as large as a word size of the external memory, possibly larger. For example, a 16-bit DDR-1 memory device may have an atomic size of 32 bits because a read of a particular 16-bit word automatically reads an adjacent 16-bit word that generally differs in only the least significant bit of the address.

The cipher stream may be logically XORed with the data for encryption and decryption. To enable random access, the address may be mapped to a fragment of the cipher stream. The mapping generally allows encryption and decryption of individual data words without accessing data words before or after the data word of interest. Established cryptographic functions may be used to generate a fragment of the cipher stream from the address. Any additional cipher bits produced by the cryptographic function may be discarded.

Using the same cipher for a large number of video frames is generally avoided since doing so would likely provide an attacker a greater opportunity to look at the statistics of the encrypted data. On the other hand, performing a different cipher for every single frame may be inefficient. For example, a significant amount of resources may be consumed to repeatedly update the cipher over a short period.

As illustrated in FIG. 1, the signal ADDR may convey one or more multi-bit (e.g., 26-bit) address values to the cipher generator 100. One or more key values may also be conveyed in the signal KEY to the cipher generator 100. The cipher generator 100 may produce one or more cipher streams that in a cryptographic sense may be considered "random". A logical exclusive OR (XOR) function between a cipher stream and the data being written to or read from the external memory may safely encrypt the data during inter-chip transfers. A latency of the cipher generator 100 is generally a few clock cycles so as not to delay reads and write to the external memory. The cipher generator 100 may be fully pipelineable so that new ciphers may be efficiently produced on a one-per-clock-cycle basis.

Conventional cryptographic components may be used to create the cipher generator 100. Criteria for encrypting data items stored in the external memory may be relatively modest in several aspects. For example, the number of address bits used at the input of the cipher generator 100 may be quite small (e.g., 20 to 30 bits) when compared with the block size of many commonly used block ciphers (e.g., 64 to 256 bits). Similarly, the number of bits in the cipher at the output of the cipher generator 100 (e.g., 32-bit cipher to XOR with 32-bit data) may also be small compared with typical block cipher block sizes.

Several types of cryptographic components may be used to implement the functionality of the cipher generator 100, depending upon speed, power and complexity of an intended application. Random number generators may use a combination of the address values and the key values as seeds to create a random value. The random value may then be used as the cipher stream to modify the data transferred to and from the external memory. Conventional random number generators may include, but are not limited to, linear conguential generators, linear feedback shift registers and combination generators (e.g., a combination of several simpler random number generators).

Another type of cryptographic component that may be used for the cipher generator 100 in certain applications may be random generators for recognized stream ciphers. The random generators for recognized stream ciphers generally produce an entire stream of cipher that may be used to encrypt data items. Conventional generators may include, but are not limited to, the RC4 stream cipher and the Software-Optimized Encryption Algorithm (SEAL) stream cipher.

Block ciphers may be used to implement the cipher generator 100. A block cipher may use an index value (e.g., a counter or an address) and a key to produce a "random" value (e.g., cipher stream). Conventional block ciphers generally include, but are not limited to, the Data Encryption Standard (DES) block cipher, the Government Standard (GOST) block cipher (Russian), the International Data Encryption Algorithm (IDEA) block cipher, the Blowfish block cipher and the Advanced Encryption Standard (AES) block cipher.

The DES block cipher is generally a suitable implementation for the cipher generator 100 of the present invention. The DES technology is relatively well matched to the application of decoding digital video. A DES block cipher may generate a 64-bit cipher stream, which is only twice as wide as the 32-bit data items typically being encrypted. In reality, DES is a 32-bit method where half the 64-bit output is simply the output of the last-but-one round.

Figure 2:
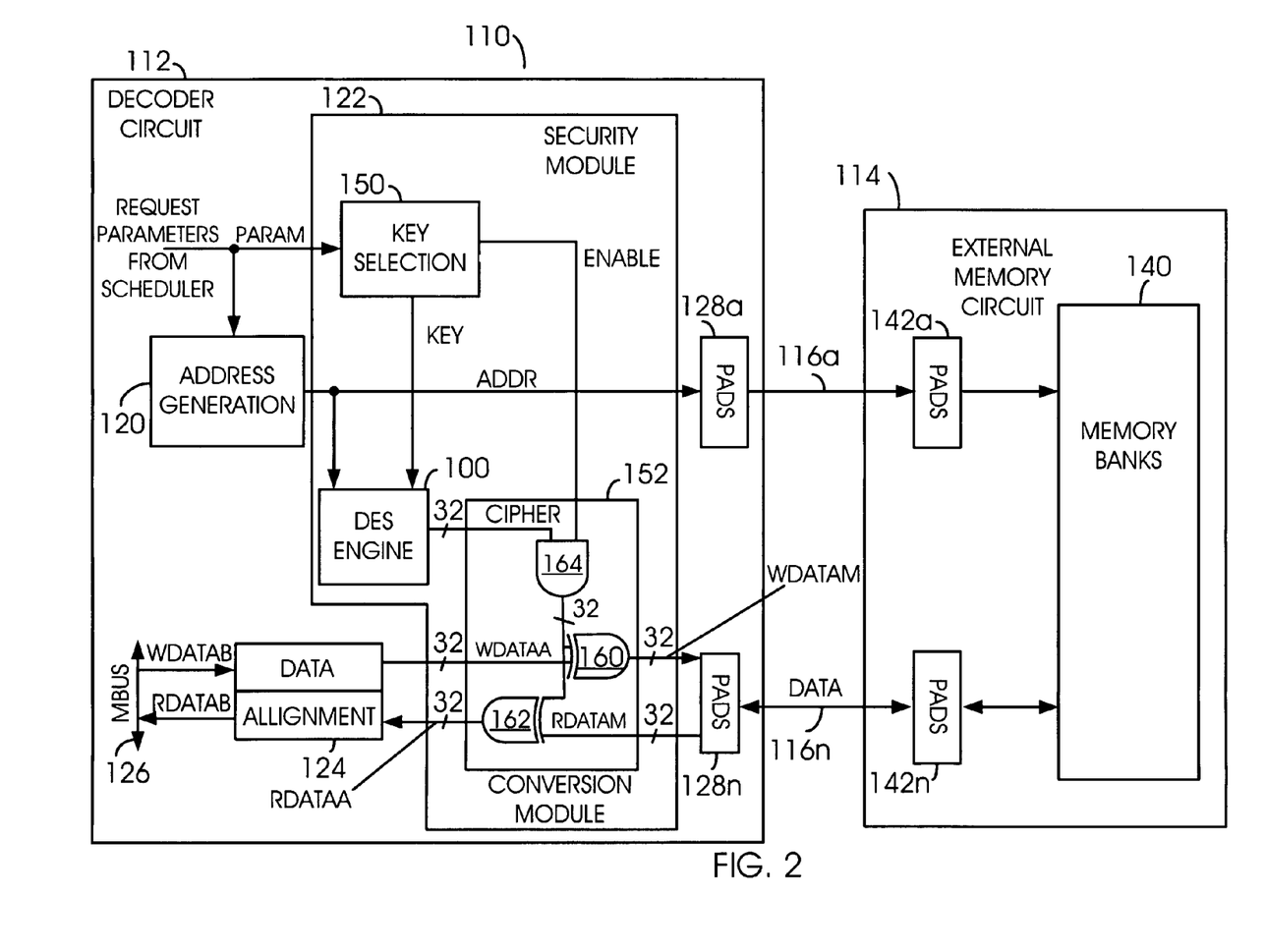
FIG. 2 is a functional block diagram of an example implementation of a system in accordance with a preferred embodiment of the present invention.

Referring to FIG. 2, a functional block diagram of an example implementation of a system 110 is shown in accordance with a preferred embodiment of the present invention. The system (or apparatus) 110 generally comprises a circuit (or die) 112, a circuit (or die) 114 and multiple interconnects (or traces) 116a-116n. The interconnects 116a-116n may provide bidirectional communication between the circuit 112 and the circuit 114. The signal ADDR may be presented by the circuit 112 to the circuit 114. A signal (e.g., DATA) may be transferred between the circuit 112 and the circuit 114 in both directions.

The circuit 112 may be refereed to as a decoder circuit. The decoder circuit 112 may be operational to decode digital video data. In various embodiments, the decoder circuit 112 may be part of an encoder circuit operational to encode the video data.

The circuit 114 may be referred to as an external memory circuit. The external memory circuit 114 may be operational to store data items received from the decoder circuit 112. In an example embodiment, the external memory circuit 114 may be a double data rate memory having a 32-bit data width and a 26-bit address range. The external memory circuit 114 may be fabricated in (or on) a die different from the decoder circuit 112. The external memory circuit 114 generally comprises one or more memory banks 140 and multiple pads 142a-142n.

The signal ADDR may carry address values. The address values may be used to address specific locations within the external memory circuit 114 to read and write data. In some embodiments, the address values may be 26-bit values. Other address widths may be implemented to meet the criteria of a particular application.

The signal DATA may carry one or more data items simultaneously between the decoder circuit 112 and the external memory circuit 114. The signal DATA may include both read data items and write data items. In some embodiments, the signal DATA may carry 32-bit data. Other data widths may be implemented to meet the criteria of a particular application.

The pads 142a-142n may be operational as unidirectional and/or bidirectional signal pads for the external memory circuit 114. The pads 142a-142n may be used to receive the signals ADDR and the signal DATA from the decoder circuit 112. The pads 142a-142n may also be used to transfer the signal DATA to the decoder circuit 112. The pads 142a-142n may also transfer other signals between the decoder circuit 112 and the external memory circuit 114 such as an enable signal, read/write signal, and other control signals.

The decoder circuit 112 generally comprises a module (or block) 120, a module (or block) 122, a module (or block) 124, a bus 126 and multiple pads (or interfaces) 128a-128n. The signal ADDR may be presented by the circuit 120 to a first subset of the pads 128a-128n. A signal (e.g., PARAM) may be received by the module 120 and the module 122. The bus 126 may present a signal (e.g., WDATAB) to the module 124. A signal (e.g., WDATAA) may be presented from the module 124 to the module 122. The module 122 may present a signal (e.g., WDATAM) to the pads 128a-128n. A signal (e.g., RDATAM) may be received by the module 122 from the pads 128a-128n. The module 122 may present a signal (e.g., RDATAA) to the module 124. A signal (e.g., RDATAB) may be presented from the module 124 to the bus 126. In some embodiments, the signals WDATAB and RDATAB may be transferred between the bus 126 and the module 122 on a common set of bidirectional wires (or traces). The signals WDATAM and RDATAM may be referred to as the signal DATA when on the interconnects 116a-116n.

The module 120 may be referred to as an address generation module. The address generation module 120 may be operational to generate address values in the signal ADDR based on one or more parameters received in the signal PARAM. The parameter values may be determined by a scheduler module of the decoder circuit 112.

The module 122 may be referred to as a security module. The security module 122 may be operational to both (i) encrypt the data items written to the external memory circuit 114 and (ii) decrypt the data items read from the external memory circuit 114. The encryption/decryption may be based on the parameter values provided by the scheduler module and the address values provided by the address generator module 120.

The module 124 may be referred to as a data alignment module. The data alignment module 124 may be operational to align data items within a (32-bit) word read from the external memory circuit 114 to a proper position within a (64-bit) word presented to the bus 126. The data alignment module 124 may also be operational to align data items within a (64-bit) word received from the bus 126 to a proper position in a (32-bit) word written to the external memory circuit 114.

The bus 126 may be referred to as a memory bus MBUS. The MBUS 126 may be used for data transfers between on-chip clients and the external memory. The parameters of the transfers may be conveyed to the memory controller over another bus (not the MBUS) as the "Request Parameters" at the input of the address generation module 120 and a key selection module 150. The MBUS 126 may be arranged to carry 64-bit wide data. Separate wires may be used to transfer data from the clients to the memory controller (writes) and from the memory controller to the clients (reads). Data transfers may be performed under the control of a 9-bit Mem-DataCmd bus that may be used to both (i) address one of the on-chip clients and (ii) indicate when data should be (a) placed on the bus by the clients for a write and (b) retrieved from the bus for a read. Other bus types and bus widths may be implemented to meet the criteria of a particular application.

The pads 128a-128n may be operational as unidirectional and/or bidirectional signal pads for the decoder circuit 112. The pads 128a-128n may be used to transmit the signals ADDR and the signal DATA to the external memory circuit 114. The pads 128a-128n may also be used to receive the signal DATA from the external memory circuit 114. The pads 128a-128n may also transfer other signals between the decoder circuit 112 and the external memory circuit 114 such as an enable signal, read/write signal, and other control signals.

The security module 122 generally comprises a module (or block) 150, a module (or block) 152 and the cipher generator module 100. The signal PARAM may be received by the module 150 and cipher generator module 100. The signal ADDR may be received by the cipher generator module 100. The signal KEY may be presented from the module 150 to the cipher generator module 100. A signal (e.g., ENABLE) may be presented from the module 150 to the module 152. The signal CIPHER may be presented from the cipher generator module 100 to the module 152. The module 152 may receive the signal WDATAA form the data alignment module 124 and present the signal RDATAA to the data alignment module 124.

The cipher generator module 100 (e.g., a DES engine) generally takes an address value and a key value to produce a new value that is essentially a "random" number in the signal CIPHER. The new random value (e.g., cipher value) may be used as a cipher that is logically XORed with the data items on the way to and/or from the external memory circuit 114.

The module 150 may be referred to as a key selection module. The key selection module 150 may be operational to generate the key values in the signal KEY based on the parameters received in the signal PARAM. The key selection module 150 may also assert and deassert the signal ENABLE based on a currently active key to activate and disable encryption/decryption of the data items flowing through the module 152.

The module 152 may be referred to as a conversion module. The conversion module 152 may be operational to encrypt data items in the signal WDATAA (e.g., logical XOR 160 with the signal CIPHER) flowing from the data alignment module 124 to the external memory circuit 114. The conversion module 152 may also decrypt data items in the signal RDATAM (e.g., logical XOR 162 with the signal CIPHER) flowing from the external memory circuit 114 to the data alignment module 124. A logical AND gate 164 may be used to enable and disable the encryption/decryption based on a state (e.g., logical high or logical low) of the signal ENABLE.

The data itself does not flow through the cipher generator module 100. The data may be kept out of the cipher generator module 100 to minimize changes to a memory controller (not shown) of the decoder module 112. In particular, routing the data around the cipher generator module 100 generally does not cause any changes in pipelining and timing. Instead, the data may be routed through the conversion module 152, that may add as little as a single gate delay.

Furthermore, the cipher generator module 100 may operate in parallel and simultaneously with other operations and circuitry within the decoder circuit 112, such as the data alignment module 124. The cipher generator module 100 may be designed to overlap with an address-to-data latency specification of the external memory circuit 114. A latency of the cipher generator module 100 is generally not added into the data flow pipeline to and from the external memory circuit 114. Depending on the speed of the cipher generator module 100, all of the latency may be hidden from a performance of the system 110.

Because the location of the cipher generator module 100 is generally tied to address generation, a single cipher generator module 100 may be used for both encryption and decryption. In some embodiments, pipeline registers may be used to align the cipher with the correct data item words. If the security module 122 were designed to route the actual data through the cipher generator module 100, then either separate units may be used for encoding and decoding, or the latency of a single cipher generator module 100 may add to a turnaround time.

Input to the cipher generator module 100 is effectively a large (e.g., 96-bit) key, created by a combination of the address value (32 bits) and the key value (64 bits). Where the cipher generator module 100 is implemented as a DES engine, the input is conventionally thought of as a 56-bit key and 64-bit data, but may be reorganized as an 88-bit key with a 32-bit input (e.g., the address) if the unused 32 bits of input data are used as additional key bits. In effect, the DES engine may be used as a "random access" pseudo-random number generator. A cipher corresponding to a given data word in the external memory circuit 114 may be generated rapidly, without generating an entire sequence of random cipher bits for all of the lower addresses.

The operations of each round in the DES engine may be unaltered, including details of the permutations, contents of SBOXs and key scheduling. The DES engine may be allowed to complete all sixteen rounds. However, the initial and final permutations may be dispensed with, since it is well know that the initial and final permutations may not contribute to the encryption strength (see Bruce Schneier, "Applied Cryptology", second edition, page 270, 12.2 Description of DES, The Initial Permutation). An arbitrary choice may be made in (i) deciding which bits of the key values and the address values go into which inputs of the DES engine and (ii) deciding which output bits may be used to encipher the data bits without undermining the security of the DES standard.

In various embodiments, the address bits may all go into the "right" half of the input so that the address bits go through the SBOXs in the first round. Similarly the "right" half of the output may be used as the 32 bits in the signal CIPHER. Otherwise, the sixteenth round generating a "left" output may cause a delayed input to the last round.

Use of the DES standard in the cipher generator module 100 may be slightly more secure than conventional uses. The increased security may be due to use of 38 bits, normally considered "input data", as part of the key instead. Any attack based on known or chosen plaintext may not work because no method exists to vary the 38 bits. Furthermore, half the 64-bit cipher stream may be discarded within the security module 122. Cracking the cipher of the present invention generally involves taking 26 bits of known plaintext (e.g., the word address) and 32-bits of ciphertext that have been XORed with image data. Using the above to recover the 56-bits of the DES key and the additional 38-bits of input data treated as additional key bits may be very difficult.

The DES standard may be enhanced for use in the present invention. Variants of the DES are generally described in the book "Applied Cryptography", second edition, by Bruce Schneier, pages 265-301, 12.2 Description of DES, published by John Wiley & Sons, hereby incorporated by reference in its entirety. For example, the SBOX contents may be varied based on additional key bits. (See page 300 of the Schneier book.) In addition, Triple-DES may be implemented where timing constraints permit.

The SBOX variations may be simple enough to implement in hardware. However, if the SBOX contents vary based on the additional key bits, then gates may be added into the data path. As such, an enhanced DES engine may be larger and slower than a conventional DES engine with fixed SBOXs.

By applying the DES to an address, a delay through the DES engine may be designed for no greater than a write latency of the external memory circuit 114. In general, a column and bank address may be supplied to the external memory circuit 114 before the data to be written. The number of clock cycles between the two above times is generally defined to as a write latency. If the write latency is longer than the delay through the DES engine, the encryption generally adds nothing to the latency of the memory system.

For most conventional DDR-2 memories, the write latency is generally a clock cycle less than the read latency. The read latency may be chosen and may be written to the DDR memory in a mode register. However, the maximum clock frequency for the DDR memory generally depends on the column (read) latency and thus is likely that a longer latency may be considered. A typical value for the read latency is four clock cycles and a typical write latency is three clock cycles.

A round in a DES engine basically involves two XOR operations and an SBOX lookup. The SBOX generally comprises a fixed table lookup with each output of the SBOX depending on six input bits. Allowing two gate delays for the XOR and four gate delays for the SBOX, a DES round generally lasts 8 gate delays resulting in 32 gate delays for four rounds. All interconnects of the DES engine are relatively localized within a data path that is effectively 48 bits wide. As such, a conventional DES engine may be sufficiently fast to keep up with a conventional DDR memory.

A trial synthesis of a DES engine was performed. The synthesis was entirely combinatorial with no flip-flops, except on the input and outputs. The synthesis generally indicated that a delay from input to output lasts just less than 16 nanoseconds, given a 250 MHz memory system clock and four cycles for the DES operation. The trial synthesis also indicated that a hardware-only DES engine may be created from approximately 32,000 gates. For DDR-1 support, two DES engines may be operated in parallel (one for each of a left and right external memory controllers) costing 64,000 gates. In some embodiments, the cipher generator module 100 may be used to directly encrypt the data items. Direct data encryption may not have the advantages of minimizing latency and minimal changes to existing hardware designs.

The key selection module 150 may be implemented as hardware-only circuitry. The amount of hardware utilized generally depends heavily on the programming model implemented. For example, a fully associative lookup of keys generally uses more gates than the table-based approach. In either case, a memory for storing the actual encryption keys may be implemented. A 4096-location, 48-bit memory for a key selection table may occupy an area of approximately 0.9 millimeters squared. Utilizing fewer locations generally decreases the silicon area used to create the table.

A common DES engine generally has 120 bits of input. The input is conventionally thought of as 64 bits of data and 56 bits of key. However, in the present embodiment of the invention, only 26 bits of address may be encrypted. All of the remaining input bits (94 in total) may be considered part of the key. In order to make the overall system 110 more secure, the keys may be changed periodically. The selection of keys using a random number generator generally means that the ciphering would have to be repeatedly broken if the image sequence is to be recovered.

The system 100 may be useful in digital encoding and decoding applications where frame stored of video data may be stored in the external memory circuit 114. For frame stores that are generally accessed with strip transfers, a unique key value may be associated with each frame store. More thoroughly, a unique key value may be associated with each value of an image base address (e.g., ImageBaseAddr). As such, each frame store may have at least two key values, a first key value for luminance and a second key value for chrominance. If a legacy codec is running that uses field stores, two unique key values (luminance and chrominance) may be associated for each field, for total of four keys.

Keys allocations for a frame store generally have a natural boundary in the video data to update the keys. Each time a frame store is allocated to hold a new image, the frame store may be assigned a new key. The new key generally remains unaltered during the lifetime of the image in the frame store. Once the image has been displayed for the last time, or used to form predictions for the last time, then the key may be deallocated. A new key may be generated for the frame store before the frame store is used again.

A simple periodic key arrangement, from a software point of view, may be a "cache" of keys indexed by values of ImageBaseAddr (ImageBaseAddr may be a parameter of a memory transfer specifying the address for the start of a frame store in the memory). A size of the key cache for a fully associative lookup of addresses generally depends on the number of frame stores that may be "live" at any given instant. A reasonable estimate of sixteen live frame stores using up to four ImageBaseAddr values generally results in 64 keys for lookup. If a smallest image of interest is 640×120 elements (e.g., 76,800 bytes) for a field of a 640×480 pixel image, a 2^28 bit address range of the external memory may be divided into 2,048 (2^11) areas (or regions) each holding 131,072 (2^17) bytes resulting in a key table of 4,096 (2^12) entries (with two keys per area).

Smaller frame stores may be used if sparsely allocated so that the ImageBaseAddr for each was distinct in the upper twelve address bits. The selection of which twelve bits are used to determine the key may be programmable so that in applications when less than the maximum amount of the external memory is implemented, the block size may be reduced such that 4,096 entries still exist in the useful part of the table.

The security module 122 generally allows for encryption of simple linear DMA transfers (as well as the encryption of 2-dimensional image data already mentioned). Simple linear DMA transfers may be useful in applications where non-image data may be encrypted off-chip. For example, software and/or firmware code may be encrypted to secure against an unauthorized attempt to disassemble the code. While a simple linear DMA transfer generally lacks a natural boundary for key changing, a potential attacker may not always see multiple plaintext, ciphertext pairs (as would be the case for frame stores if the key were not changed). Once the code is written to a location, the code will likely remain unaltered for a considerable time. Similarly the attacker may not be able to choose the plaintext (as for images by supplying a chosen bitstream).

The simple scheme of a key table lookup that may work for images will generally also work for simple linear DMA transfers. In the case of strip transfers, the same key may be used for all memory words located in a given frame store. The key value decisions may be based on an address for the start of the frame store instead of the address for each individual word within the frame store. The starting address may be used because the image base address is generally passed to all strip transfer requests within the field or frame.

The latency of the key selection module 150 may be governed by the frequency at which new parameters may be accepted For example, in the present embodiment of the invention, the bus protocols mean that after a request has been initiated, a further new request may not be initiated until after four clock cycles. Therefore, the key selection logic may use up to the four clock cycles to decide the key value based on the Request parameters with no loss of performance.

A hierarchical partitioning of a memory map may be established for the external memory circuit 114. At the top level, a number of large areas of external memory circuit 114 may be either (i) allocated a unique key value that applies to that whole area or (ii) broken down into a number of smaller blocks. The smaller blocks, in turn, may either (i) have a unique key value or (ii) be broken down to smaller blocks again.

Figure 3:
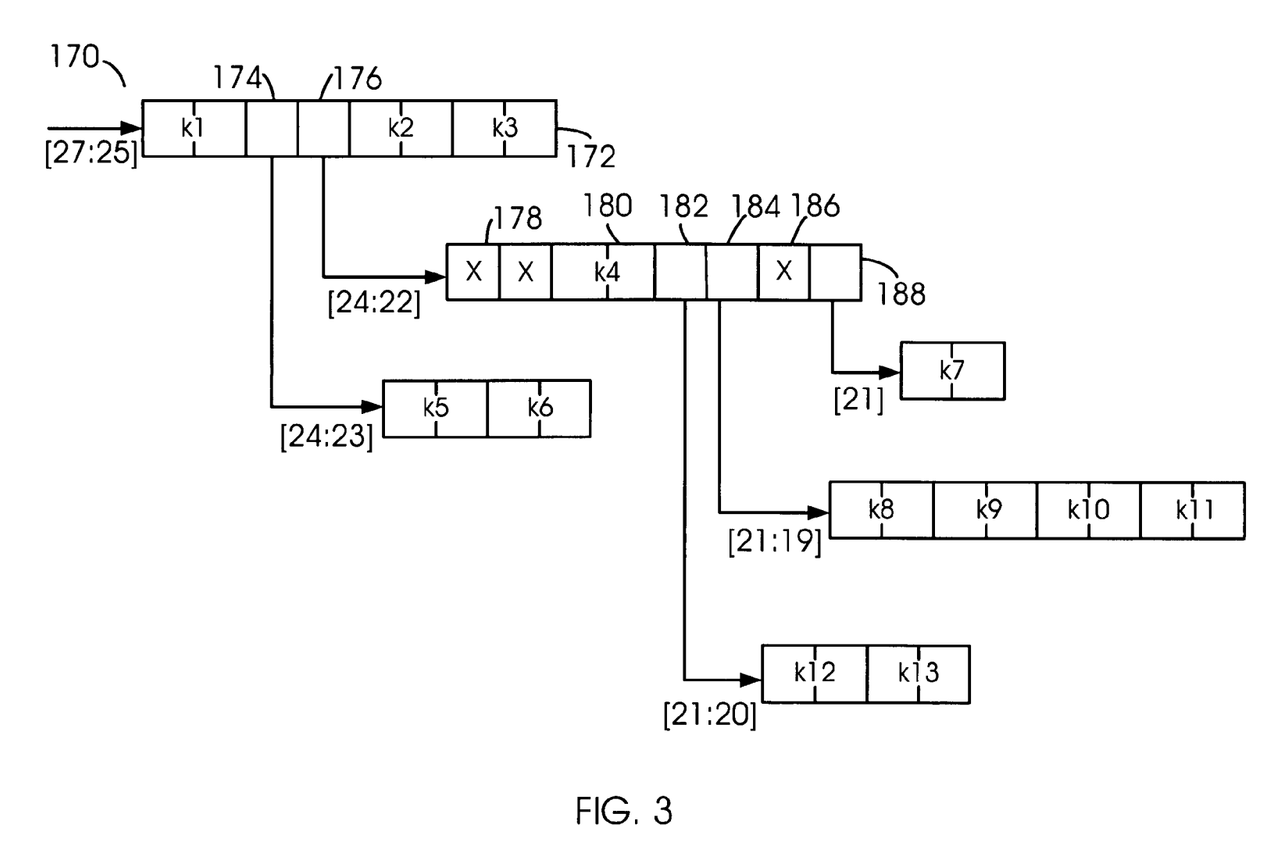
FIG. 3 is a block diagram of an example hierarchical assignment of encryption keys.
Figure 4:
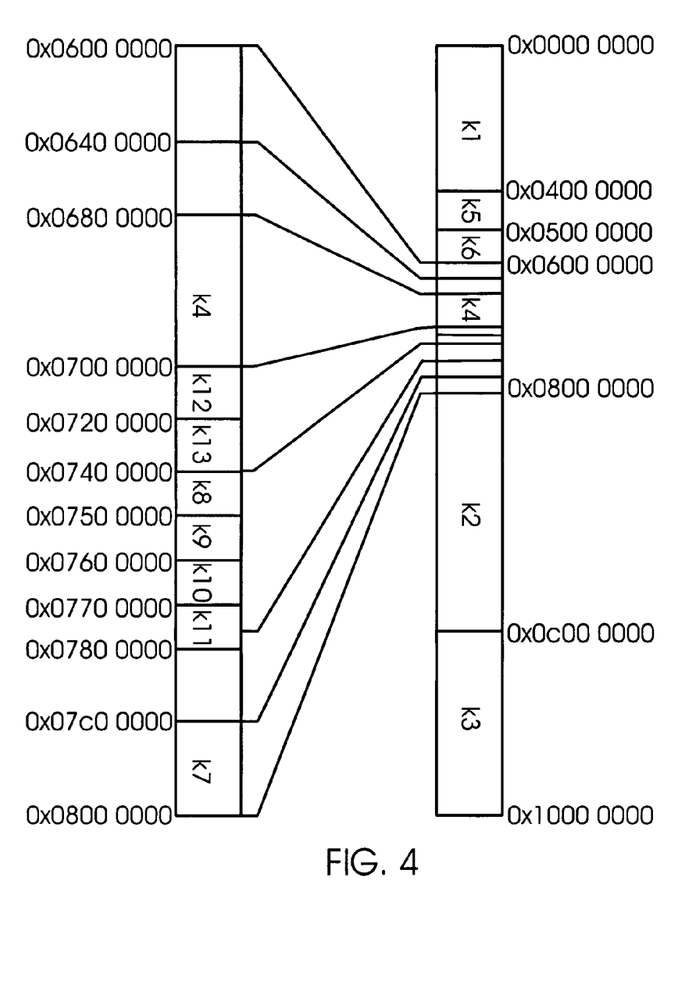
FIG. 4 is a block diagram of an example mapping between the keys of FIG. 3 and an address space.

Referring to FIG. 3, a block diagram of an example hierarchical assignment 170 of encryption keys is shown. Referring to FIG. 4, a block diagram of an example mapping between the keys of FIG. 3 and an address space is shown. The 26-bit address space of the external memory circuit 114 may be divided into multiple areas, each having one or more unique keys. For example, at a top level 172 of the hierarchy, the address space may be sectioned into four areas (or regions). Three of the four areas may be allocated unique key values (e.g., K1, K2 and K3). The fourth area (e.g., between K1 and K2) may be associated with multiple keys.

The fourth area may be divided into two sub-areas 174 and 176. The area 174 may be covered by two keys (e.g., K5 and K6). The area 176 may be further subdivided into multiple (e.g., six) areas 178-188. One or more of the areas (e.g., 180 and 188) may be allocated unique keys (e.g., K4 and K7). One or more of the areas (e.g., 178 and 186) may not have any allocated keys (e.g., no encryption of the data written to or read from the associated areas in the external memory circuit 114). Still other areas (e.g., 182 and 184) may be further split into multiple areas, each with a unique key (e.g., 182=K12 and K13, 184=K8, K9, K10 and K11). Note that the different areas may have different sizes. For example, the key K4 may span an address space larger than the key K7.

A number of bits from the upper bits of physical address values may be used to index into a key table. In the example illustrated, three upper bits (e.g., [27:25]) are generally used at the first level 172. In an application were less than a maximum amount of physical memory is connected to the decoder circuit 112, the lower order bits (e.g., bits [25:23] in the case of a 64 Mbyte total DRAM) may be used as the top level 172.

The lookup table generally produces a multi-bit (e.g., 48-bit) lookup value from the address value. Depending on the top bit, the lookup value may be treated as either (i) part of an encryption key or (ii) as information to cause another level of indirection.

If the lookup value is treated as another level of indirection, the lookup value is generally divided into a number of fields. The fields may indicate (i) a number of bits of the address value that are significant, (ii) which bits of the address value may be selected, (iii) a base address in the key table and (iv) a flag indicating whether encryption is to be applied in the respective address range or not. If the flag indicates that no encryption is to be performed, the other fields may be ignored and the next level of table lookup generally does not occur. In the example illustrated, the non-encryption flag situation may occur when bits [27:25] indicate the value "3" and bits [24:22] the values "0", "1" or "6". If the flag indicates that encryption is to be performed, an index into the table is generally formed by replacing the indicated number of bits at the bottom of the key table base address with the indicated bits of the strip or block transfer base address.

A predetermined maximum number (e.g., two) of further levels of indirection may be permitted after the initial table lookup. If too many levels of indirection are attempted, the hardware may proceed with the memory transaction with no encryption and an interrupt may be generated.

When the top bit of a value read from the key table indicates that the just-read lookup value is to be treated as part of an encryption key, the adjacent location at the address formed by inverting the bottom bit of the address in the key table may be read from the lookup table. The above two lookup values together generally specify the encryption key in the signal KEY. Since both of the 48-bit lookup values each have a 1-bit flag to indicate key/indirect, each of the lookup values may carry 47 bits of encryption key giving a total of 94 bits of key for the DES process.

Figure 5:
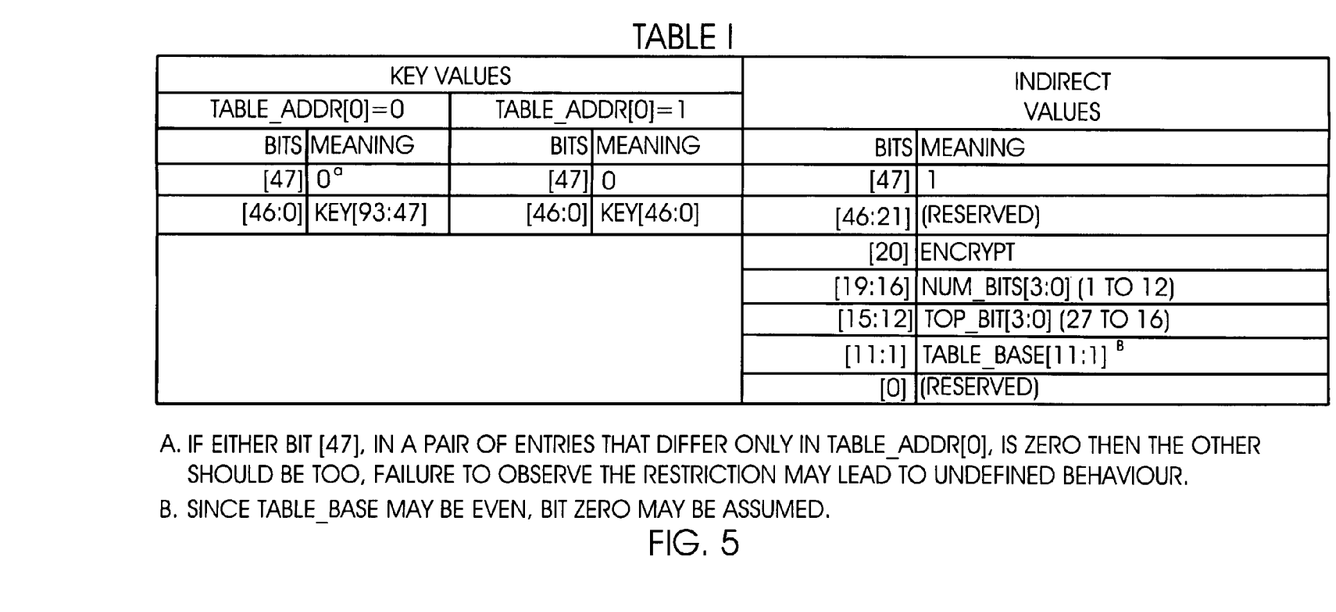
FIG. 5 is a table of an example allocation of bits in a key table.
Figures 6, 6G:
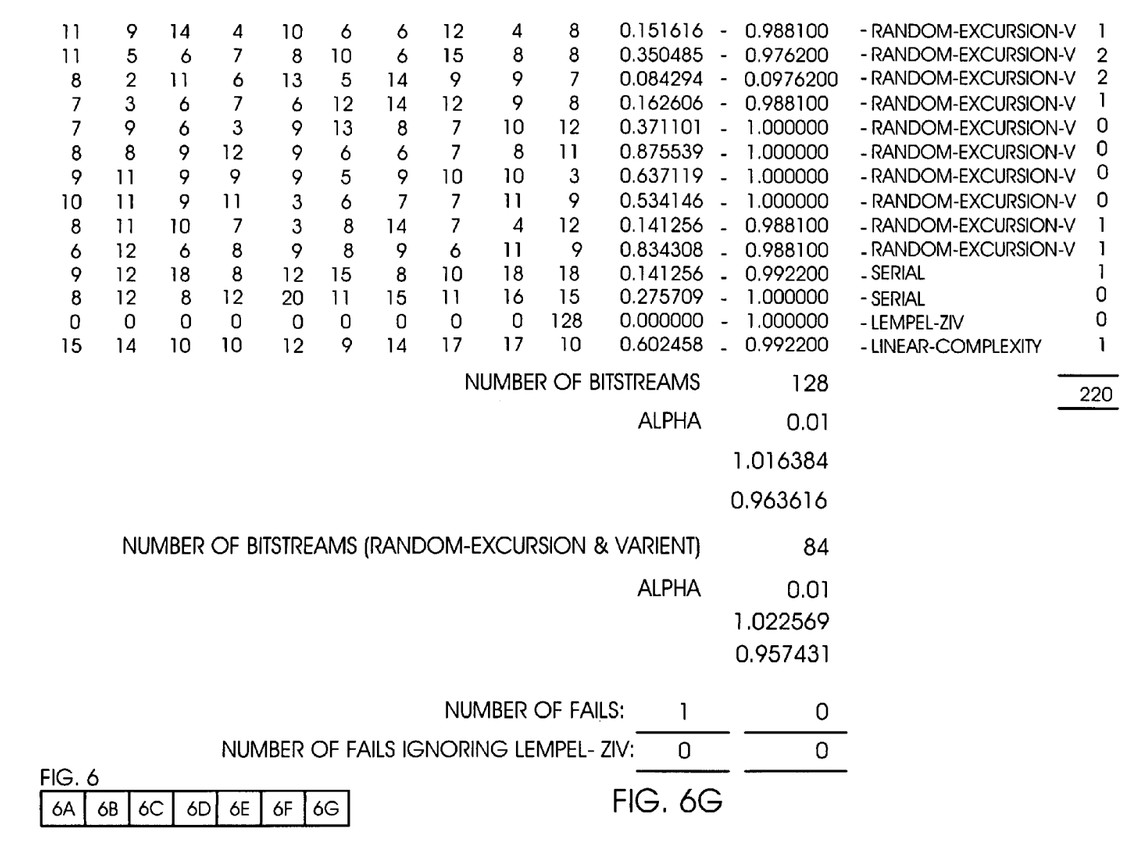
Figure 6B:
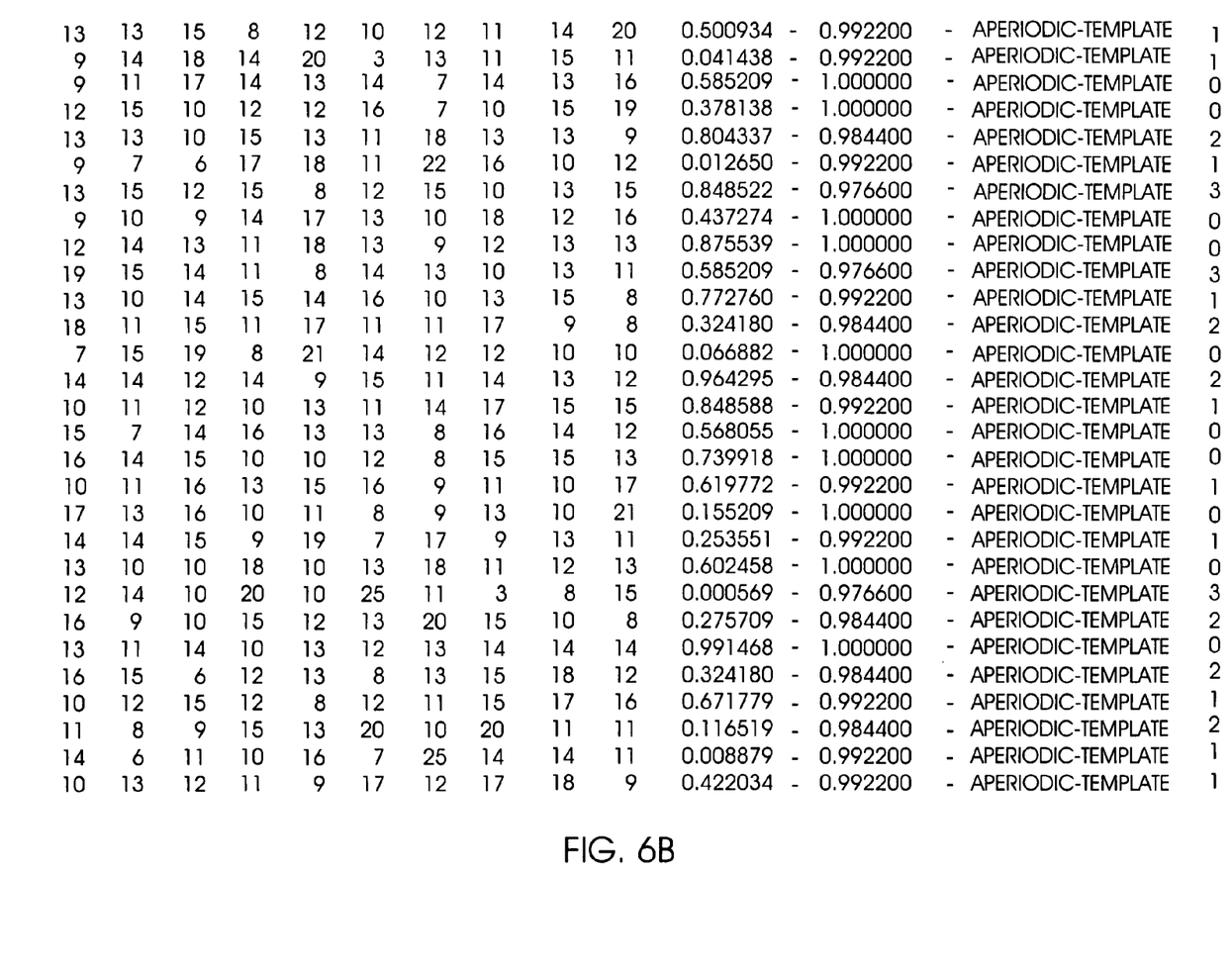
Figure 6C:
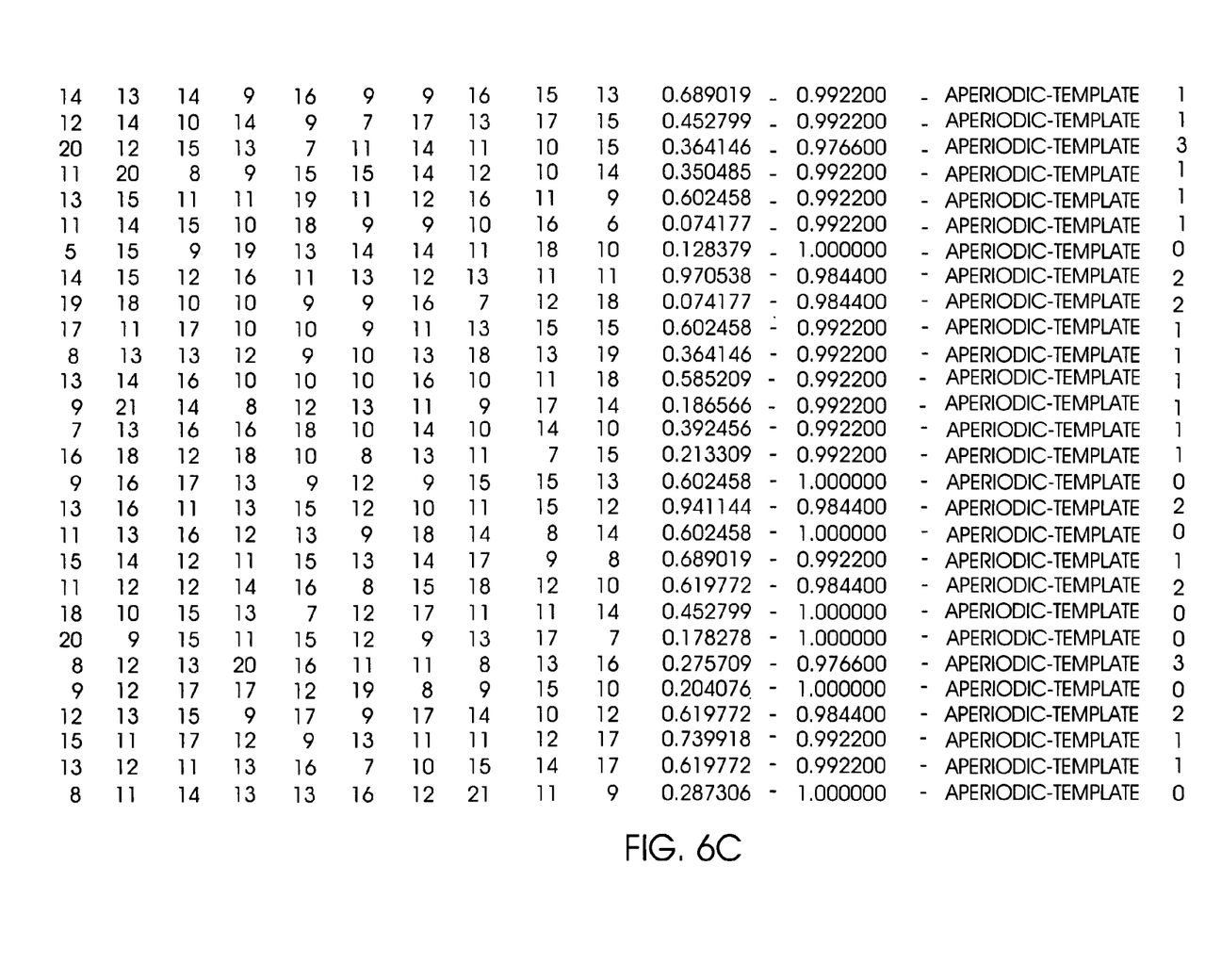
Figure 6D:
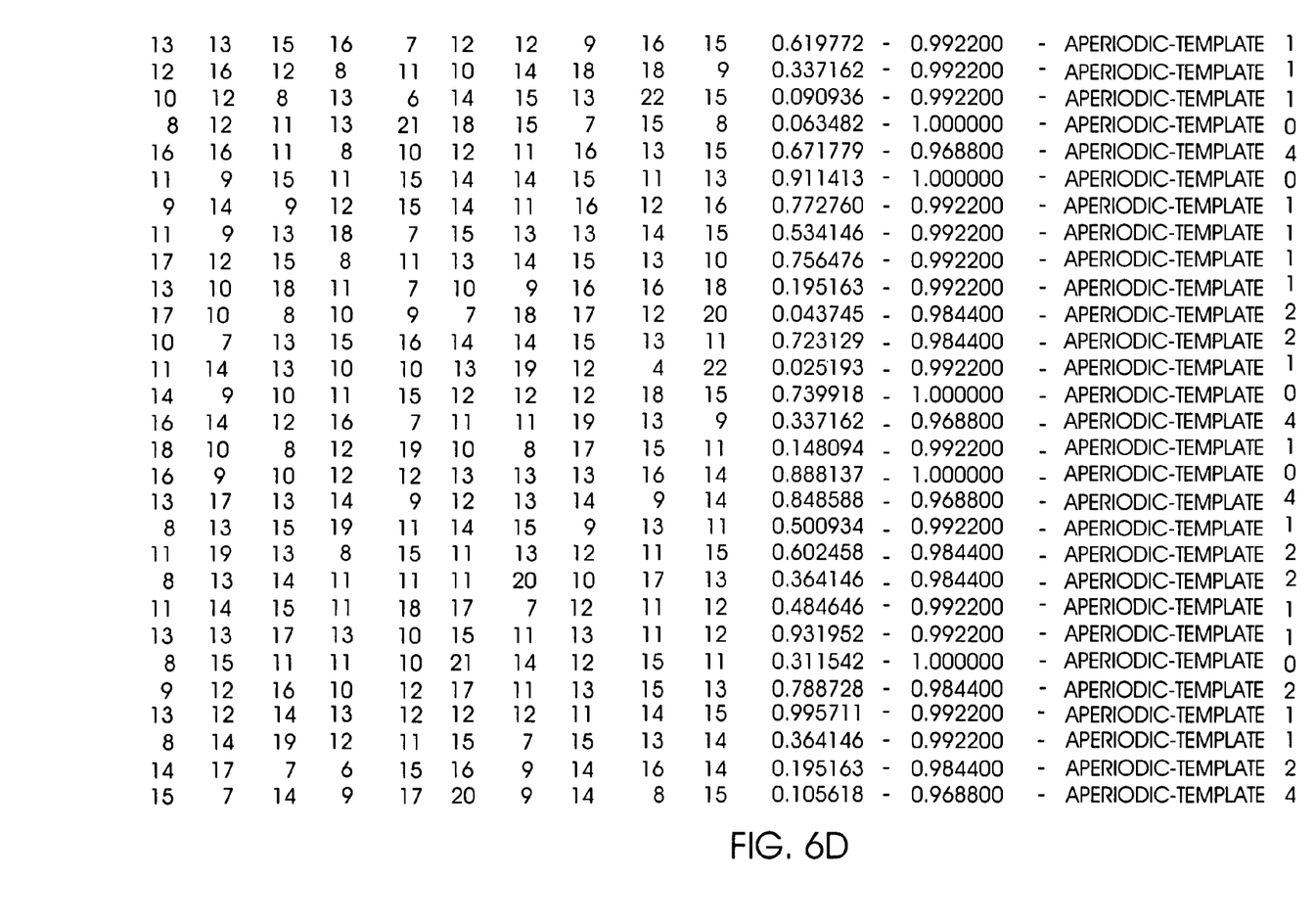
Figure 6E:
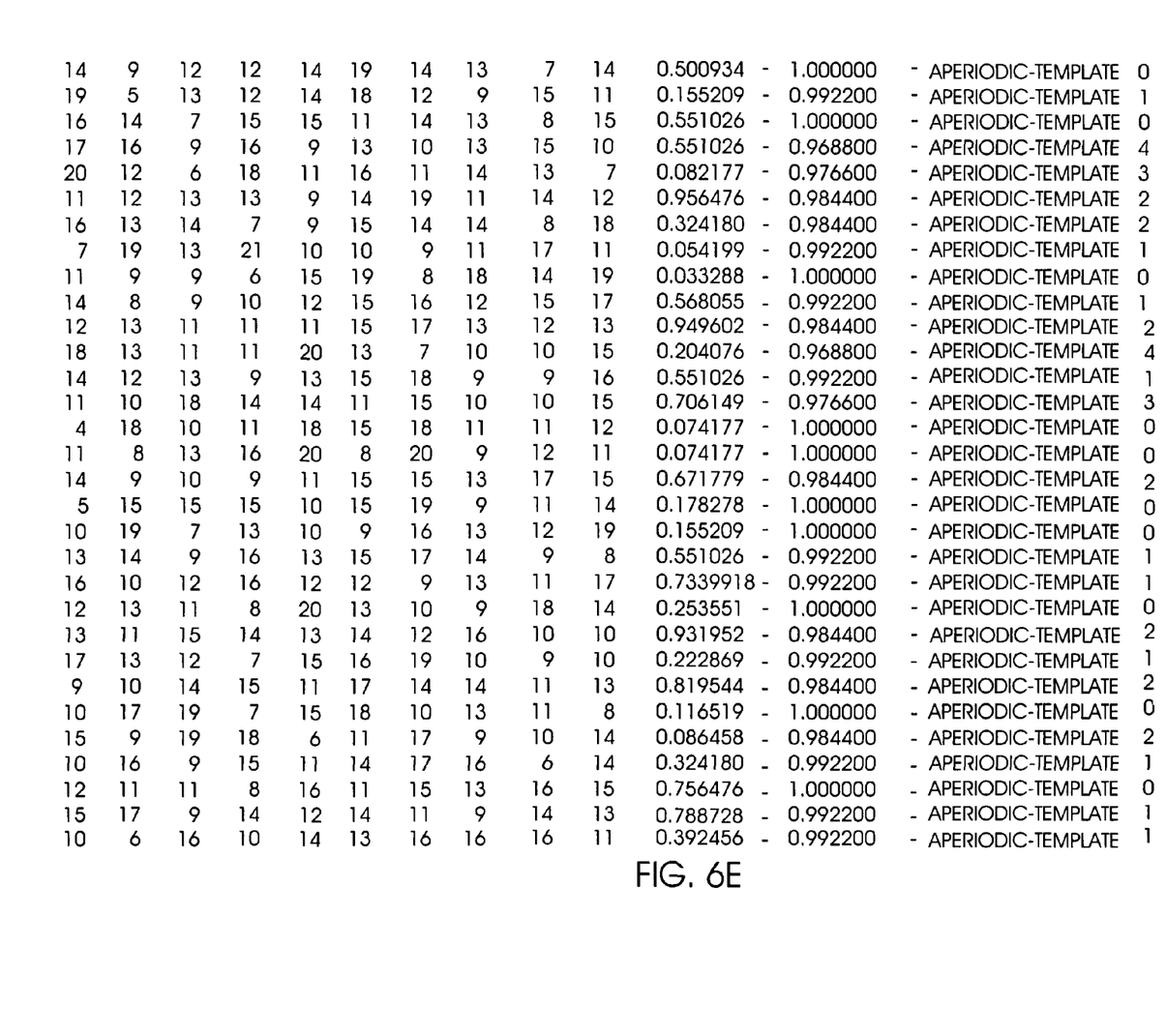
Figure 6F:
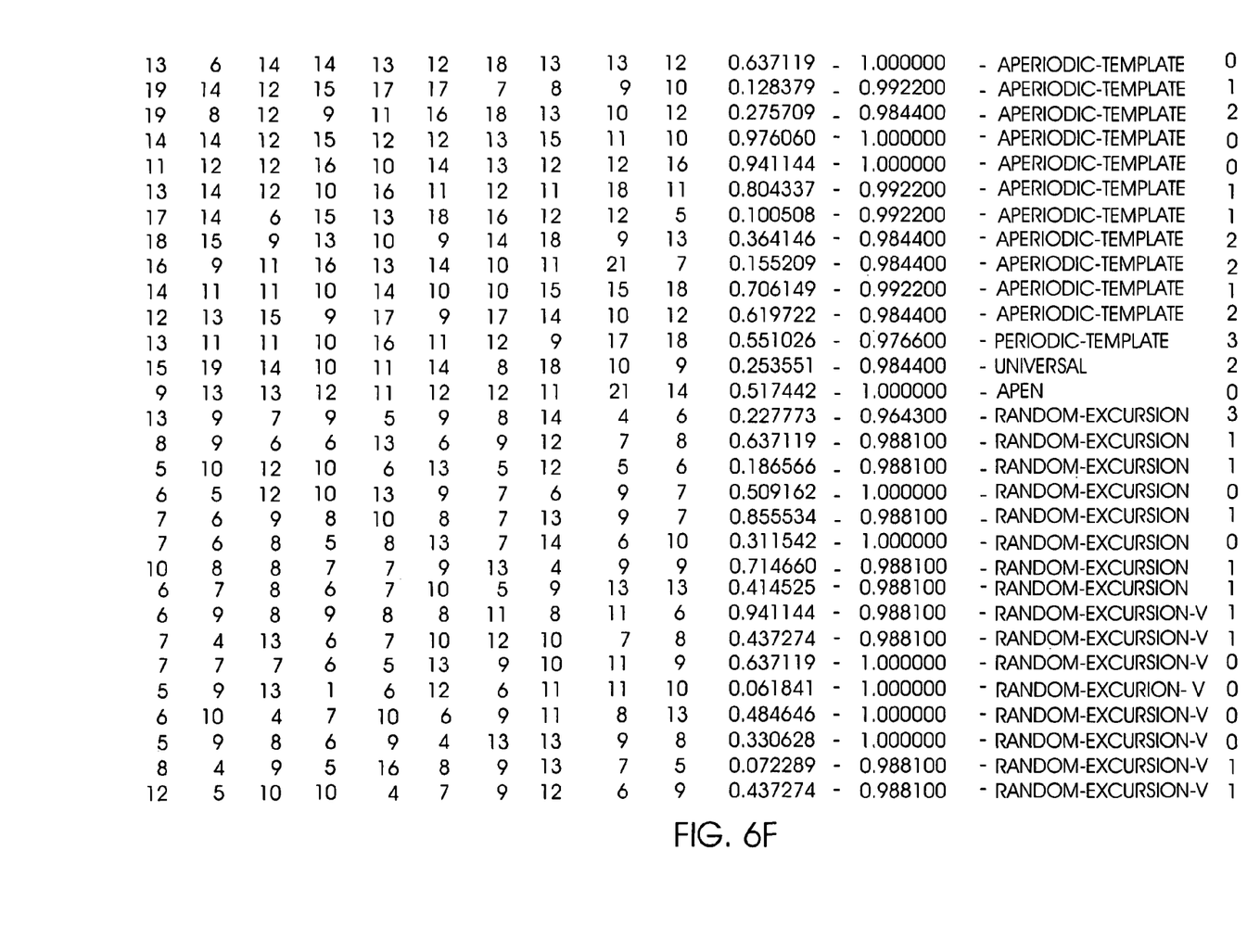

Referring to FIG. 5, a TABLE I of an example allocation of bits in a key table is shown. The size of the key table is generally a compromise between silicon area and the functionality afforded by being able to specify encryption keys on a fine grid. In a video decoding application, a table of 4,096 48-bit values (totaling 24,576 bytes or 196,608 bits) may be sufficient. A format of the words in the key table may be vary, depending on the application. The example allocation provided in the TABLE I may be suitable for a video decoding application.

For an initial lookup in the key table, the flag encrypt and the fields num_bits, top bit and table_base may be supplied by a register that may be programmed by one or more controlling processors. Note that a value in the field table_base is generally not assumed to be zero for the initial lookup. The assumption may allow a software program executing on one of the controlling processors a clean method to update the key table by simply building a new version of the key table and then pointing at the complete key table. The above approach generally avoids the hardware seeing an incomplete or inconsistent table. An encrypt flag in the register generally acts a global flag. The encrypt flag may be reset to zero during booting so that no memory accesses are encrypted during the booting and the values in the uninitialized key value table may not be read.

In another embodiment, the key table may perform an associative lookup of the base address. A main hardware expense for the associative lookup may be in (i) registers holding the addresses to be compared against and (ii) hardware for the comparators. Since four clock cycles may be available to perform the associative match, a single comparator may be used four times over to save some of the hardware costs. So, for example, if support is provided to match 64 ImageBaseAddresses (e.g., for strip transfers), then only sixteen comparators may perform the work. Each of the comparators may have four associated address registers that may be compared one register per clock cycle.

For block transfers, a range of addresses using two address registers may be defined. The software may specify that any address in the range N<=ADDR<M may be encrypted with the associated key. Adders may be included in the key selection module 150 for the comparison functions. In contrast, a simple equal-to comparison may be useful for strip transfers to match the ImageBaseAddress is generally smaller and may consume less power. Where adder-based comparators are implemented for block transfers, the comparators may be reused for strip transfers. The comparators may be used in pairs (i) to match a single range for block transfers or (ii) two equal-to comparisons for strip transfers.

The number of bits for the address registers and comparators generally depends on how fine a control on the boundary between encryption regions is specified. For example, 20-bit registers and comparators generally allow the address values to be specified down to a 256-byte boundary. As such, a scheme that allows up to 256 frame store base addresses to be matched in strip transfers may be created. For block transfers, up to 128 address ranges may be specified. The 128 address ranges may be implemented with a total of 64 20-bit adders, 512 20-bit registers and storage for 384 94-bit keys (in a RAM).

A model of a video decoding application was simulated with a DES engine used as a random number generator for the cipher generator 100. An STS (statistical test suite) battery of statistical tests was applied to the DES engine, a very high quality reference generator and a simple linear conguential generator. The high quality reference generator and conguential generator were tested for comparison to the DES engine. See "A Statistical Test Suite For Random And Pseudorandom Number Generators For Cryptographic Applications" NIST Special Publication 800-22, May 15, 2001, Andrew Rukin et al., Gaithersburg, Md. (http://csrc.nist.gov/publications/nist-pubs/).

The methodology used in the testing was to produce streams of "random data" to be tested from each of the generators. The streams were considered 128-bit streams each having a length $1024^2$ bits long. The statistical tests were run using the following parameters:

Enter Block Frequency Test block length: 16,384
Enter Non-Overlapping Template Test Block Length: 9
Enter Overlapping Template Test Block Length: 9
Enter Universal Test Block Length: 7
Enter Universal Test Number Of Initialization Steps: 1,280
Enter Approximate Entropy Test Block Length: 8
Enter Serial Test Block Length: 8
Enter Linear Complexity Test Subsequence Length: 1,0241

With the above parameters, a total of 189 separate statistical tests were performed and the results are analyzed.

The known good generator uses the Mersenne Twister generator to produce blocks of 1,024 (32-bit) words that may then be hashed using SHA-512 to yield 512 random bits. The simple linear conguential generator is generally modeled by the following formula:

$$(seed*2147001325UL)+715136405UL$$

Such sequences are generally known to be poor random sequences for cryptographic applications. For example, if all of the bits of the linear conguential generator are retained, the least significant bit may toggle (be alternately one then zero) in successive words.

The DES engine generally takes 26-bits of counter input and places the counter input to appear in the 26 least significant bits of the "right" input to the DES engine after the initial permutation. Since the resulting bitstreams only include $2^{27}$ bits (e.g., $2^{22}$ 32-bit words) the upper four bits of the counter input were not exercised. The remaining input bits and the 56-bits of key input were taken from a 94-bit key, which was an arbitrarily chosen constant. The 32-bit output was taken from the output of the last (sixteenth) DES round before the final permutation.

Referring to FIGS. 6A-6G, a spreadsheet of an STS report from the DES engine testing is shown. The STS report generally suggests two ways to evaluate the gathered statistics and determine whether a generator is indeed random. A first way may be based on a uniformity of P-values generated for each of the (128) bitstreams for one of the (189) tests. A second way may be to see how many of the (128) bitstreams appear to be not random. (A truly random generator may generate some bitstreams that appear to have some form of structure and therefore sometimes appear to some tests as non-random. The issue is whether the number of apparently non-random bitstreams is in fact consistent with what would be expected from a truly random generator.)

The results generally show that the Mersenne Twister based generator performed excellently. With one exception, all tests indicate that the Mersenne Twister based streams are random for both of the STS suggested criteria. The results generally show that the DES generator also performed excellently. The DES generator did not fail any of the tests, except the Lempel-Ziv test, on either of the two criteria. The results generally showed that the linear conguential generator failed the statistical tests with approximately a third of the tests concluding that the generator is not random.

The function performed by the block diagram of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for protecting data between a circuit and a memory, comprising the steps of:
  (A) generating a particular address among a plurality of addresses based on a parameter received in a first signal, said particular address accessing a particular area among a plurality of areas in said memory, wherein said particular address is different than said parameter;
  (B) generating a second signal using said parameter directly from said first signal, wherein (i) said second signal carries a particular key among a plurality of keys, (ii) said particular key is associated with said particular area and (iii) said particular address and said second signal are generated in parallel;
  (C) generating an encrypted address by a block encryption of said particular address using as an encryption key a concatenation of (i) said particular key and (ii) at least part of said address; and
  (D) logical exclusive ORing a data item with said encrypted address such that said data item is encrypted during a transfer between said circuit and said memory.

2. The method according to claim 1, wherein said logical exclusive ORing of said data item with said encrypted address is performed before said data item leaves from said circuit to said memory.

3. The method according to claim 1, wherein said logical exclusive ORing of said data item with said encrypted address is performed after said data item is received into said circuit from said memory.

4. The method according to claim 1, further comprising the step of:
  altering said keys over time such that said encrypted address of said particular area is dynamic.

5. The method according to claim 1, further comprising the step of:
  allocating at least one of said keys to each of said areas in said memory used as a frame store of video data.

6. The method according to claim 1, further comprising the steps of:
  allocating a first key of said keys to chrominance data of video data; and
  allocating a second key of said keys to luminance data of said video data.

7. The method according to claim 1, further comprising the step of:
  allocating at least two of said keys to each of said areas in said memory used as a field store of video data.

8. The method according to claim 1, further comprising the step of:
  allocating one of said keys to each of said areas in said memory used in a block transfer of data within a range of said addresses, wherein said particular address is in said range.

9. The method according to claim 1, wherein step (B) comprises the sub-step of:
  determining said particular key of said particular area using an associative lookup of said parameter identifying said particular area.

10. The method according to claim 1, wherein said keys form a hierarchical partitioning of a memory map for said memory.

11. A circuit comprising:
  an address generator module configured to generate a particular address among a plurality of addresses based on a parameter received in a first signal, said particular address accessing a particular area among a plurality of areas in a memory, wherein said particular address is different than said parameter; and
  a cipher module configured to (i) generate a second signal using said parameter directly from said first signal, wherein (a) said second signal carries a particular key among a plurality of keys, (b) said particular key is associated with said particular area and (c) said particular address and said second signal are generated in parallel, (ii) generate an encrypted address by a block encryption of said particular address using as an encryption key a concatenation of (a) said particular key and (b) at least part of said address and (iii) logical exclusive OR a data item with said encrypted address such that said data item is encrypted during a transfer between said circuit and said memory.

12. The circuit according to claim 11, wherein said circuit and said memory are formed in separate dies.

13. The circuit according to claim 11, wherein said cipher module comprises:

an encryption module configured to generate said encrypted address using said particular address as a plaintext input.

14. The circuit according to claim 13, wherein a write latency of said memory is at least as long as a delay through said encryption module.

15. The circuit according to claim 11, wherein said cipher module comprises:
a key selection module configured to generate said particular key based directly on said parameter associated with said particular area.

16. The circuit according to claim 11, wherein said cipher module comprises:
a conversion module configured to perform said logical exclusive OR between said encrypted address and said data item (i) before said data item is written to said memory and (ii) after said data item is read from said memory.

17. The circuit according to claim 16, wherein said cipher module further comprises:
an alignment module coupling said conversion module to a bus, said alignment module configured to adjust an alignment of said data item between said conversion module and said bus.

18. The circuit according to claim 11, wherein said data item is decoded video data in digital form.

19. A circuit comprising:
an address generation module for generating a particular address among a plurality of addresses based on a parameter received in a first signal, said particular address accessing a particular area among a plurality of areas in a memory, wherein said particular address is different than said parameter;

means for generating a second signal using said parameter directly from said first signal, wherein (i) said second signal carries a particular key among a plurality of keys~ m~ (ii) said particular key is associated with said particular area and (iii) said particular address and said second signal are generated in parallel;

means for generating an encrypted address by a block encryption of said particular address using as an encryption key a concatenation of (i) said particular key and (ii) at least part of said address; and means for logical exclusive ORing a data item with said encrypted address such that said data item is encrypted during a transfer between said circuit and said memory.

* * * * *